US012170858B2

(12) United States Patent
Popp

(10) Patent No.: US 12,170,858 B2
(45) Date of Patent: Dec. 17, 2024

(54) BACKGROUND DISPLAY DEVICE, CAMERA AND METHOD OF DISPLAYING A REPRESENTATION OF A VIRTUAL BACKGROUND

(71) Applicant: Arnold & Richter Cine Technik GmbH & Co. Betriebs KG, Munich (DE)

(72) Inventor: Hermann Popp, Munich (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 120 days.

(21) Appl. No.: 17/963,378

(22) Filed: Oct. 11, 2022

(65) Prior Publication Data
US 2023/0113256 A1    Apr. 13, 2023

(30) Foreign Application Priority Data

Oct. 11, 2021    (DE) .................. 102021126309.3

(51) Int. Cl.
*H04N 5/222* (2006.01)
*H04N 23/73* (2023.01)
*H04N 9/31* (2006.01)

(52) U.S. Cl.
CPC .......... *H04N 5/2224* (2013.01); *H04N 23/73* (2023.01); *H04N 9/3194* (2013.01)

(58) Field of Classification Search
CPC .... H04N 5/2224; H04N 23/73; H04N 9/3194; H04N 5/2625; H04N 5/2627; H04N 7/183; H04N 23/71; H04N 23/74; H04N 5/272

See application file for complete search history.

(56) References Cited

U.S. PATENT DOCUMENTS

| | | |
|---|---|---|
| 2015/0348326 A1 | 12/2015 | Sanders et al. |
| 2018/0315865 A1* | 11/2018 | Haist ................ H01L 31/02327 |
| 2019/0142265 A1* | 5/2019 | Bos .................... A61B 1/00006 |
| | | 600/188 |

(Continued)

FOREIGN PATENT DOCUMENTS

| | | |
|---|---|---|
| DE | 102010035811 A1 | 4/2012 |
| JP | 2003298936 A | 10/2003 |

(Continued)

OTHER PUBLICATIONS

German Patent and Trademark Office Communication issued in Application No. 10 2021 126 309.3, dated Mar. 7, 2022.

(Continued)

*Primary Examiner* — Mekonnen D Dagnew
(74) *Attorney, Agent, or Firm* — Amster, Rothstein & Ebenstein LLP

(57) ABSTRACT

In a method of displaying a representation of a virtual background by means of a background display device for a recording by a camera in a virtual image recording studio, the display of the representation of the virtual background takes place in accordance with a time control. The camera further records the display of the representation of the virtual background in accordance with a sequence of exposure times and the time control of the display of the representation of the virtual background and the sequence of exposure times are synchronized with one another.

20 Claims, 8 Drawing Sheets

(56) References Cited

U.S. PATENT DOCUMENTS

Figure 1:
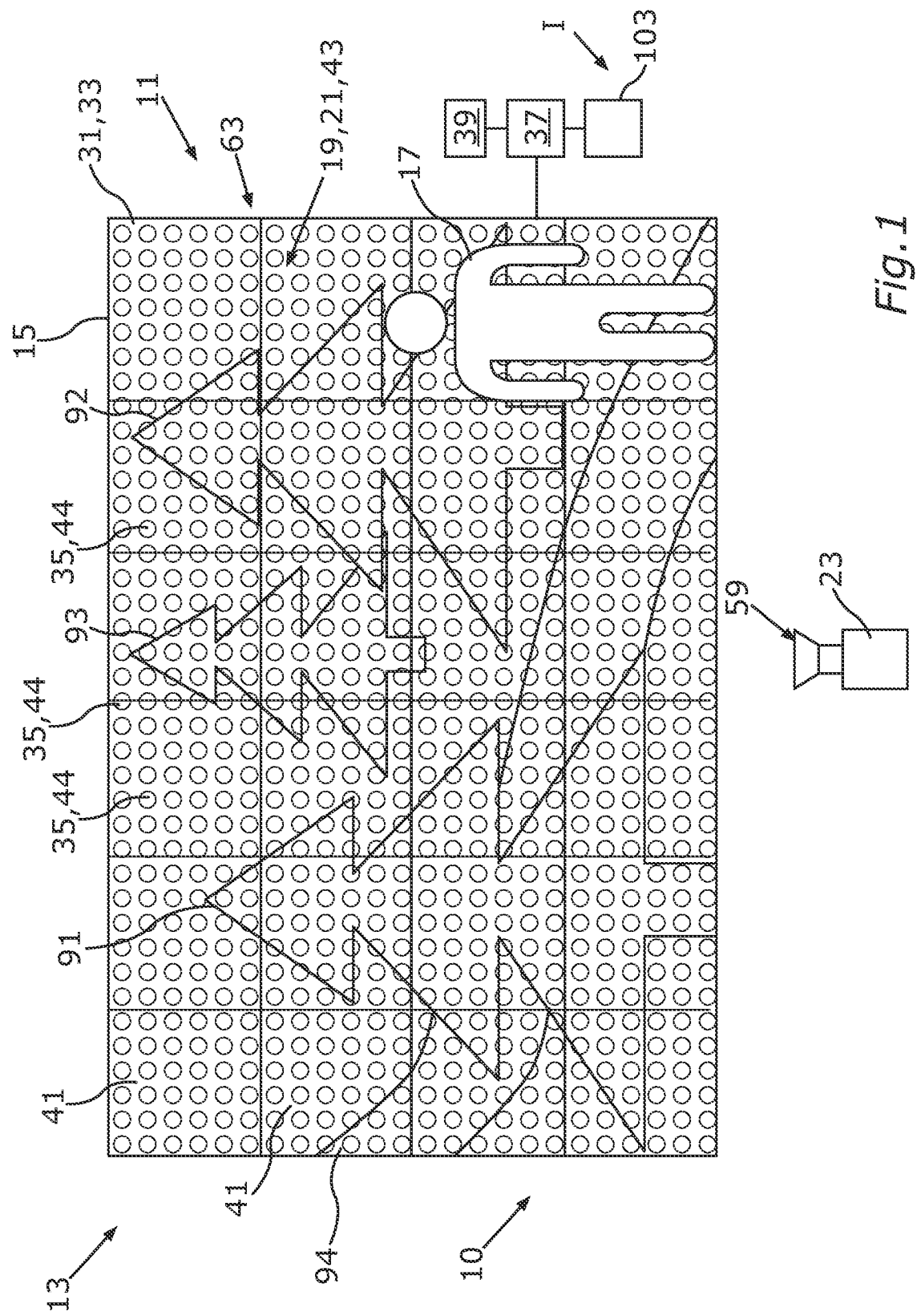

2020/0145644 A1* 5/2020 Cordes ................ H04N 13/111
2021/0297717 A1* 9/2021 Braun .............. H04N 21/41415

FOREIGN PATENT DOCUMENTS

| JP | 2005268838 A | 9/2005 |
| JP | 2008097191 A | 4/2008 |
| WO | 2020053416 A1 | 3/2020 |

OTHER PUBLICATIONS

Anonymous: "The Dark BAY Virtual Production Stage was built to provide film and television series productions with a" ARRI, Jun. 10, 2021, pp. 1-10, XP055974820, found in the internet: URL:https://www.arri.com/news-en/arri-supported-the-creation-of-the-dark-bay-virtual-production-stage.

European Patent Office Communication issued in Application No. 22200067.1, dated Mar. 9, 2023.

* cited by examiner

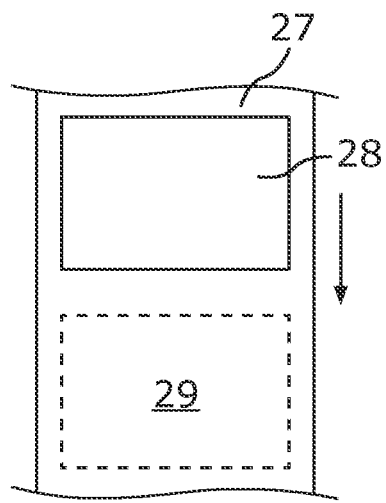
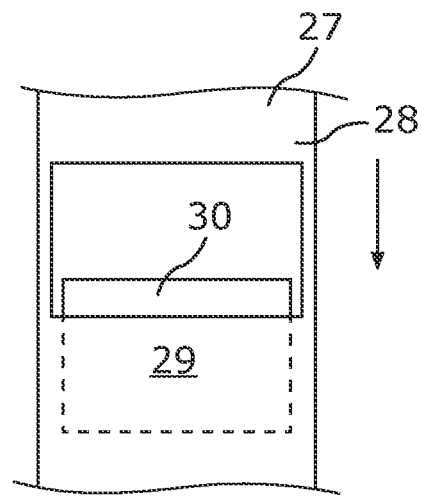
Fig.5A          Fig.5B
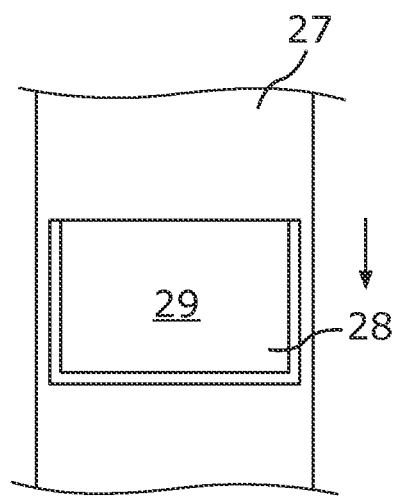
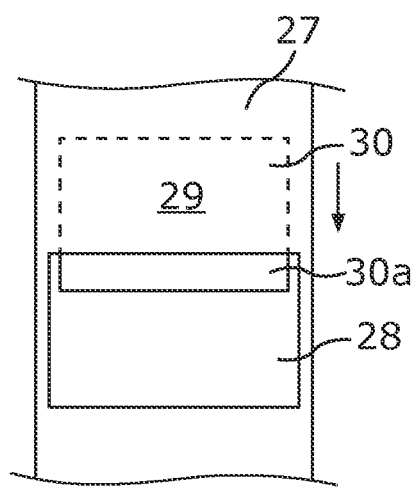
Fig.5C          Fig.5D

BACKGROUND DISPLAY DEVICE, CAMERA AND METHOD OF DISPLAYING A REPRESENTATION OF A VIRTUAL BACKGROUND

The invention relates to a background display device for a virtual image recording studio that is configured to display, behind a real subject, a representation of a virtual background for a camera recording.

The invention further relates to a camera for a recording of such a representation of a virtual background and to methods of displaying a representation of a virtual background by means of a background display device for a recording by an associated camera in a virtual image recording studio.

Background display devices can in particular be provided to display in an image recording studio a landscape or an environment in which a recording is to be made by means of an associated camera and which forms a virtual background for a scene to be recorded. The image recording studio, for example, can be a film studio for recording moving image sequences or a photo studio in which individual images or still images are recorded. In general, such a recording can include local storage of image data or a transmission to a remote location (e.g. Broadcast, Streaming). In the virtual image recording studio, a virtual background or a virtual environment can thus be created in which an actor can move around during a moving image recording, or it can form a background for a still image recording. The virtual background mentioned in the present context therefore comprises image information that represents a background subject and that can be directly recorded by an associated camera as an apparently real environment of a (foreground) scene. The representation of the virtual background "behind" a real subject is to be understood comprehensively in this context since the virtual environment can also be provided above or below the real subject.

For example, when recording moving images, a background display device can be used to display a representation of a virtual background to be able to record a scene directly in the intended environment. In particular, as a result of this, the acting can be facilitated since possible events occurring in the virtual background can be perceived by an actor and the actor can react to these events. In contrast to the use of a green screen for example where the environment is not visible to the actor, the actor can therefore adapt his acting to any background events and a director, a camera person or any other person involved in a shooting can already gain an overall impression of the scene during the shooting and can evaluate the scene. In addition, the entire scene or a corresponding section of a film can be viewed and checked directly after the recording, without the background provided for the scene also having to be superposed.

In the case of still image recordings, such a background display device can, for example, be used to record photographs in basically any surrounding in an image recording studio, and thus in a controllable environment, and to have the resulting image fully in view while taking the photograph. The background and the real subject or a person to be photographed can thus be optimally matched or coordinated with one another. In addition, the recorded photo can be viewed immediately, in order to carry out necessary adjustments if required.

To display the representation of the virtual background, background display devices can in particular form or have an electronic display, which has an active pixel matrix, and can, for example, comprise an active illumination apparatus having a plurality of light-emitting elements. For example, to display a representation of a virtual background in a virtual image recording studio, an LED wall can be used whose light-emitting diodes can be controllable individually and/or in groups of adjacent light-emitting diodes or in arrays of light-emitting diodes. Light-emitting diodes of such an LED wall can, for example, be provided as LEDs (Light Emitting Diodes) or as OLEDs (Organic Light Emitting Diodes). Furthermore, the light-emitting diodes can be part of a liquid crystal display. Such background display devices can, for example, extend over a width of at least 5 m and a height of at least 2 m to be able to record several actors in front of a common (virtual) background.

Furthermore, background display devices can comprise a plurality of panels at which the picture elements are arranged and which together form the LED wall. While the panels can be substantially two-dimensional and the picture elements arranged at a panel can extend in a two-dimensional arrangement, it can, for example, be achieved by a suitable arrangement of a plurality of panels that the background display device is sectionally curved and/or arched. The background display device can thereby be arranged, for example, both behind and above or below the real subject in the virtual image recording studio in order also to enable the direct recording of a representation of a virtual sky, or of a virtual ceiling of a room, or of a virtual floor in the image recording studio. Alternatively to an LED wall, a representation of a virtual background can generally also be generated by light spots that are produced by a reflection or a transmission at a light source wall, for example, a screen for a rear projection. For this purpose, the active light generation can take place by a projector, wherein the light sources are merely formed indirectly on the screen.

Such a background display device can in particular make it possible to visually present a virtual background, which can in particular represent a three-dimensional scene, by appropriately controlling the picture elements and/or to adapt said virtual background by changing the control during a recording. A background display device thus offers the possibility of representing a virtual background for a scene to be recorded in an animated and easily adaptable manner and thereby, in particular, of facilitating the acting or the gestures.

To record a moving image sequence in the virtual image recording studio, the camera can, for example, generate a sequence of images of the representation of the virtual background, wherein the camera can in particular record the images at a predefined or settable image recording rate or frame rate. The background display device can also be configured to change the representation of the virtual background in time in order, for instance, to be able to display movements in the virtual background. This change of the representation can also take place at a specific refresh frequency (also called a "refresh rate") so that the displayed representations can, for example, be changed at the refresh rate or exchanged with a respective next representation.

In general, during a recording in such a virtual image recording studio, it is expedient to synchronize the frame rate of the camera provided for the recording and the refresh rate of the background display device with one another so that each representation of the virtual background displayed by the background display device is associated with a respective image generated by the camera. Furthermore, provision can be made that the background display device displays the representation of the virtual background at a certain light pulse frequency that is higher than the refresh rate. During an image recording, the associated camera can thus possibly register a plurality of light pulses that reproduce the representation of the virtual background.

However, even with such a synchronization between the refresh rate of the background display device and the frame rate of the camera, there is the problem that the camera typically does not generate an image during an entire image recording time, but any light-sensitive elements of the camera are only exposed during a settable exposure time and/or within a settable exposure window that can generally be freely selectable and does not have to be linked to the frame rate. Since settings can be made at the camera that are in this regard detached from the frame rate, but relevant for the image recording, an exclusive synchronization between the frame rate of the camera and the refresh rate of the background display device can be insufficient for achieving a natural image of the representation of the virtual background that resembles an image of a real background corresponding to the virtual background. For example, different regions of a light-sensitive element of the camera can register different numbers of light pulses during a recording in dependence on an exposure setting so that different regions of the image generated by the camera can also be exposed differently. Furthermore, in the case of an insufficient synchronization between the camera and the background display device, a so-called tearing effect can arise in the image generated by the camera when the representation of the virtual background is refreshed during an exposure and ultimately two different representations of the virtual background are imaged in the same image.

It is therefore an object of the invention to provide possibilities for recording a representation of a virtual background that is displayed by a background display device in a virtual image recording studio, by which possibilities uniformly illuminated images of the representation of the virtual background can be generated and imaging errors arising due to a refreshing of the representation can be avoided.

This object is satisfied by a method of displaying a representation of a virtual background by means of a background display device for a recording by a camera in a virtual image recording studio, wherein the display of the representation of the virtual background takes place in accordance with a time control, and wherein the camera records the display of the representation of the virtual background in accordance with a sequence of exposure times. Furthermore, the time control of the display of the representation of the virtual background and the sequence of exposure times are synchronized with one another in the method.

To enable such a synchronization of the time control of the display of the representation of the virtual background display and the sequence of exposure times, the camera and the background display device can in particular be linked to one another via a network. Such a link can in particular enable a synchronization of time signals of the camera and the background display device via a corresponding network protocol, for example PTP (Precision Time Protocol), as will also be explained below.

In some embodiments of this method, the background display device can comprise a plurality of actively illuminating picture elements, in particular a plurality of light-emitting diodes, that form a two-dimensional arrangement. The actively illuminating picture elements can in particular be controllable individually and/or in groups of picture elements to display the representation of the virtual background.

In some embodiments, the background display device can further be configured as an LED wall and the picture elements can be configured as light-emitting diodes or light-emitting diode units. The light-emitting diodes of such an LED wall can, for example, be configured as LEDs (Light Emitting Diodes) or as organic light-emitting diodes or OLEDs (Organic Light Emitting Diodes). Furthermore, in the case of an LED wall, provision can be made that the individual picture elements, which together generate the representation of the virtual background, are formed by individual light-emitting diodes. However, the individual picture elements can also be formed by respective light-emitting diode units, wherein each light-emitting diode unit can in particular comprise a plurality of light-emitting diodes, in particular three light-emitting diodes. For example, a light-emitting diode unit can also comprise three, four or more light-emitting diodes, wherein the plurality of light-emitting diodes of a light-emitting diode unit can in particular have different emission spectra and can optionally be equipped with a color mixer. Furthermore, in such a light-emitting diode unit, provision can be made that the individual light-emitting diodes of the light-emitting diode unit can be selectively controlled to produce a desired color of the picture element formed by the light-emitting diode unit. A light-emitting diode unit can in particular comprise a light-emitting diode emitting red light, a light-emitting diode emitting green light, and a light-emitting diode emitting blue light.

In some embodiments, provision can be made that the picture elements can be individually controlled to generate the representation of the virtual background. By controlling the picture elements, a respective color and/or brightness of the picture element can in particular be settable to be able to set a section or a point of the representation of the virtual background that is displayed by the respective picture element to the intended color and/or brightness.

In some embodiments, the background display device can extend in a vertical and/or horizontal orientation, in particular with continuous or quasi-continuous transitions. For example, provision can be made that the background display device extends in a vertical orientation in a planar manner behind the real subject to display the representation of the virtual background behind the real subject.

Alternatively or additionally, provision can, however, also be made that the background display device at least sectionally extends in a horizontal orientation so that the representation of the virtual background can also be displayed above the real subject, for example. Furthermore, the background display device can be configured to surround and to cover the real subject in order to enable as complete as possible a display of the virtual background over a large angular range. In a section in which the background display device transitions from a vertical orientation into a horizontal orientation, the background display device can also be arched and/or curved. In particular in an assembly of the background display device from a plurality of panels, the panels can be assembled to form different and, for example, vault-like geometries in order to provide a desired environment for a recording in the virtual image recording studio. Furthermore, in some embodiments, provision can be made that the background display device is sectionally arranged on a floor of the virtual image recording studio. In such sections, the background display device can also in particular extend in a horizontal orientation.

In some embodiments, the background display device can further be configured to illuminate the real subject. This background display device can in particular serve to illuminate the real subject in addition to other illumination of the virtual image recording studio. For example, it can thereby be achieved that the real subject casts a shadow to be expected when illumination sources, for example a street lamp, are included in the virtual background in that the illumination of the real subject to be expected from a real street lamp starts from the displayed representation of the street lamp of the virtual background. However, the background display device can also be configured to sectionally emit light for illuminating a scene and can so-to-say act as a spotlight, while the background display device can display the representation of the virtual background at other sections.

In some embodiments, the background display device can furthermore be configured to vary the representation of the virtual background in time during the recording, in particular during the recording of a scene, by the camera. Events taking place in the virtual background can thereby in particular be displayed directly by means of the background display device during a camera recording so that, unlike, for example, in the case of a green screen recording, an actor can react to these events and can correspondingly adapt the acting thereto. Consequently, the background display device can in particular be configured to display a film sequence, which can be recorded directly by the camera, during the camera recording. A subsequent superposition of the recording of the camera with a provided background is thus no longer necessary.

The camera can, for example, be configured as an analog camera or as a digital camera and can have a light-sensitive element, wherein the light-sensitive element can, for example, be formed by a film or by an image sensor. The camera can in particular be a motion picture camera (also referred to as a moving image camera) that is configured to generate a sequence of recorded images. Each of the recorded images can correspond to a respective exposure of the light-sensitive element so that two consecutive images can be separated by an exposure pause of the camera in which an incidence of light on the light-sensitive element is prevented or not considered.

Such a camera configured as a motion picture camera can in particular generate consecutive images at a specific or settable frame rate so that, for the recording of an image, a respective image recording time can be available as the reciprocal of the frame rate. The exposure time can correspond to a portion of the image recording time during which the light-sensitive element is exposed to light. For the remaining portion of the image recording time, the light-sensitive element can, in contrast, be protected from an incidence of light, for example, in that a camera shutter is mechanically closed or in that, in order to generate a digital image data set, only charge generated at the light-sensitive sensor elements of the sensor is considered that was generated as a result of an incidence of light during the exposure time, whereas charge generated outside the exposure time is not considered. This can, for example, be achieved in that the charge of the sensor elements is canceled or is reset to a reference value by a corresponding circuit before an intended exposure in order then, starting from completely discharged sensor elements, to begin with the exposure and the recording of an image and to read out the sensor elements after the exposure time has elapsed. Such a circuit for reading out an image sensor is described in DE 10 2010 035 811 A1, for example.

In general, the exposure time can thus correspond to a duration of an exposure during which a light-sensitive element of the camera is exposed to light. Furthermore, the exposure time of the camera can take place from the start of a photoelectric or photochemical signal generation in a first light-sensitive region up to the end of this signal generation in a last light-sensitive region of the camera. This can in particular be provided when the camera has a so-called global shutter in which all the regions of the light-sensitive element are simultaneously read out and/or protected from an incidence of light so that the exposure can start at the same start time and end at the same end time in each region of the light-sensitive element.

However, provision can also be made that different regions and in particular different rows of light-sensitive sensor elements of an image sensor of a camera are exposed after one another when the individual rows of an image sensor are read out after one another, for example. In such a successive row-wise readout of an image sensor, one row of sensor elements of the image sensor can, for example, be exposed first, wherein the exposure of a subsequent row can start as soon as the exposure of the previous row is completed and the readout of the charge generated during the exposure has begun in the previous row. The exposure times of the individual rows of the image sensor can thus be offset from one another. Such a readout and exposure of the rows of the sensor elements in particular enables an electronic reproduction of a mechanical rolling lens shutter or rolling shutter in which an opening of a lens shutter is moved over or along the light-sensitive element—a film or an image sensor—so that different regions of the light-sensitive element are released for an incidence of light by the opening of the lens shutter and closed again at different times. In such a mechanical rolling shutter or electronic rolling shutter, the exposure times can nevertheless ultimately be the same for all the regions or rows of the light-sensitive element, wherein, however, starting points in time of the exposures of the individual regions or rows can differ from one another.

In this regard, the exposure time can generally correspond to the exposure time set at the camera by a cameraman and, in the case of an electronic camera having an image sensor, the term in particular refers to the duration of the exposure of a respective sensor element. In the case of a rolling shutter, this is in particular the duration of the exposure of the sensor elements of a respective row, wherein the exposure times of the different rows can be offset from one another and the exposures of the individual rows can start at different starting points in time. The time interval from the starting point in time of the exposure of the first sensor element (e.g. the first sensor row) up to the end point in time of the exposure of the last sensor element (e.g. the last sensor row) can therefore be referred to as the exposure window so that the exposure window in a rolling shutter can ultimately be longer than the single exposure time due to the shifted exposure times of the individual rows of sensor elements. Similarly, in a mechanical rolling shutter, the exposure time can refer to a duration for which a respective point of the light-sensitive element of the camera—a film or an image sensor—is subjected to an incidence of light during a single image recording. In a mechanical rolling shutter, the exposure time is also less than an exposure window of the camera that refers to the time interval from the start of an exposure of a first exposed region of the light-sensitive element up to the end of the exposure of the last exposed region of the light-sensitive element.

In a global shutter, in which for instance the charge of all the light-sensitive sensor elements of an image sensor is read out simultaneously, the exposure window can, in contrast, correspond to the exposure time. Very generally, in both a rolling shutter and a global shutter, there can be an exposure pause between two consecutive exposure windows, wherein light incident during an exposure pause is not converted into a sensor signal by any of the sensor elements of an image sensor or the light-sensitive element is mechanically protected from an incidence of light.

Since the time control of the display of the virtual background and the sequence of exposure times are synchronized with one another, the problems mentioned in the introduction can in particular be countered. The synchronization of the time control of the display of the representation can in particular comprise adapting a frequency and/or a point in time or a phase position of a control of the background display device or of a control of parts of the background display device. For example, the phase position of refresh times at which the displayed representation of the virtual background is changed at the background display device can be adapted in dependence on the exposure times and in particular such that the representation is only changed outside the exposure time and/or an exposure window of the camera in order to avoid the initially explained tearing effect. The synchronization of the sequence of exposure times can comprise adapting a frequency of consecutive exposure times and/or adapting a respective point in time or a phase position of the exposure times and/or adapting a respective duration of the exposure times. For example, by adapting a phase position of a starting point in time of an exposure within an image recording time by the camera, it can also be achieved that an exposure window of the camera and/or the exposure time of the camera is/are shifted within the image recording time such that a change of the display of the representation of the virtual background takes place outside the exposure window of the camera.

For example, by synchronizing the time control of the background display device and the sequence of exposure times of the camera, the exposure times can further be matched to a light pulse frequency of the background display device at which the background display device displays the representation of the virtual background such that each region of the light-sensitive element of the camera, and in particular each row of sensor elements of an image sensor, registers the same number of light pulses during an exposure time. For example, brightness differences between different rows of the image sensor can hereby be avoided if the rows are exposed and/or read out at different times.

Furthermore, a frame rate of the camera and a refresh rate of the background display device can generally be matched to one another so that the camera can record a first representation of the virtual background during a respective exposure to be able to record a second representation of the virtual background, which is changed with respect to the first representation, in the subsequent exposure. In this regard, the frame rate can correspond to the refresh rate. However, provision can also be made that the frame rate is greater than the refresh rate and in particular corresponds to an integer multiple of the refresh rate, for example twice or four times the refresh rate, so that two recordings of the first representation and two recordings of the second representation can, for example, be generated by means of the camera.

Further embodiments can be seen from the claims, from the description and from the drawings.

The invention further relates to a method of displaying a representation of a virtual background by means of a background display device, in particular a background display device as disclosed herein, for a recording by a camera, in particular a camera as disclosed herein, in a virtual image recording studio. In this method, the representation of the virtual background is intermittently displayed in accordance with a light pulse frequency and is intermittently recorded in accordance with an exposure time of the camera. Furthermore, in the method, the exposure time of the camera is set in dependence on the light pulse frequency of the background display device or the light pulse frequency of the background display device is set in dependence on the exposure time of the camera. In this method, the exposure time of the camera and/or the light pulse frequency of the background display device is/are furthermore set such that the exposure time corresponds to an integer multiple of the reciprocal of the light pulse frequency.

As already explained, the background display device can in particular be configured to display the representation of the virtual background in a pulsating manner at a specific and/or settable light pulse frequency, wherein this light pulse frequency can in particular be greater by a multiple than the frame rate. The light pulse frequency can in particular correspond to an integer multiple of a frame rate of the camera and provision can, for example, be made at a frame rate of the camera of 60 fps (frames per second) or 60 Hz to operate the background display device at a light pulse frequency of 1920 Hz or 3840 Hz, while, at a frame rate of 50 Hz, for example, 1600 Hz or 3200 Hz can be provided as the light pulse frequency. At a frame rate of 24 Hz or 24 fps, the background display device can also, for example, be operated at a light pulse frequency of 1920 Hz or of 3840 Hz.

While the light pulse frequency of the background display device can thus be matched to the frame rate of the camera, which can in particular also correspond to a refresh rate of the background display device, the exposure time of the camera can generally be freely settable and can correspond to any desired portion of the image recording time. In this regard, the exposure time or an exposure window of the camera, during which individual rows of an image sensor operated as an electronic rolling shutter are, for example, successively exposed with the set exposure time, can be independent of the frame rate so that there can be no integer relationship between the light pulse frequency of the background display device and the exposure time of the camera despite the match between the frame rate of the camera and the light pulse frequency.

Since, however, in particular in cameras having a rolling lens shutter, different regions of a light-sensitive element, for example different rows of an image sensor, can be exposed at different times, different numbers of and/or different irregularly incomplete light pulses can be registered in different rows of sensor elements during an image recording due to the lack of a link between the exposure time and the light pulse frequency, which can lead to a modulation of the brightness over the different regions or rows in the image of the representation of the virtual background generated by the camera.

Since, however, the exposure time of the camera and the light pulse frequency of the background display device can be synchronized with one another such that the exposure time corresponds to an integer multiple of the reciprocal of the light pulse frequency, it can be achieved that, for example, each row of an image sensor exposed and read out row-wise registers the same number of light pulses during an exposure so that a modulation over the rows of the image sensor can be prevented. Due to such a synchronization, it can in particular also be achieved that even on a phase shift between the starting points in time of the individual exposure times of the individual rows of the image sensor, for example at the start of an exposure in a row, just that portion of a light pulse is cut off which is still registered in the row by the last light pulse registered within the exposure time of this row. Overall, an integer and constant number of complete light pulses can thus be recorded in each row. The synchronization can in particular take place such that the exposure time corresponds to an integer multiple of the reciprocal of the light pulse frequency greater than one. Accordingly, each row of the image sensor can record at least two light pulses during each exposure.

The synchronization of the exposure time of the camera and the light pulse frequency of the background display device can take place by adapting the exposure time at the camera or by adapting the light pulse frequency at the background display device. On an adaptation of the exposure time at the camera, this can, for example, take place automatically by automatically setting the exposure time such that the exposure time corresponds to an integer multiple of the reciprocal of the light pulse frequency. Alternatively, the adaptation can, however, take place manually at the camera, for which purpose, selectable permitted exposure times, which correspond to an integer multiple of the reciprocal of the light pulse frequency, can be displayed to a user, for example. The background display device can also be configured to automatically set an adapted light pulse frequency in dependence on the exposure time of the camera and/or to display a selection of possible light pulse frequencies to a user from which the user can choose.

In some embodiments, the exposure time of the camera and/or the light pulse frequency of the background display device can further be determined in the method. For example, the light pulse frequency of the background display device can be transmitted to the camera so that the camera and/or a control device of the camera can determine permitted exposure times that correspond to a multiple of the reciprocal of the light pulse frequency. The permitted exposure times can, for example, be displayed at the camera, in particular on a display, so that a user can manually choose between the permitted exposure times. Alternatively thereto, the exposure time of the camera can, for example, be transmitted to the background display device so that a control device of the background display device can, for example, set the light pulse frequency such that the exposure time corresponds to an integer multiple of the reciprocal of the light pulse frequency or corresponding light pulse frequencies can be displayed to the user and offered for selection.

The invention further relates to a method of displaying a representation of a virtual background by means of a background display device, in particular a background display device as disclosed herein, for a recording by a camera, in particular a camera as disclosed herein, in a virtual image recording studio, wherein the representation is changed at refresh times and is recorded in accordance with a respective exposure of the camera. In this method, exposure pauses of the camera between consecutive exposures are set in dependence on the refresh times of the background display device or the refresh times of the background display device are set in dependence on exposure pauses of the camera between consecutive exposures. The respective setting of the exposure pauses and/or of the refresh times further takes place such that a respective change of the representation of the virtual background takes place during an exposure pause of the camera.

Due to such a matching of the refresh times to the exposure pauses of the camera, it can in particular be achieved that the representation of the virtual background is not changed at a point in time at which a region or a row of a light-sensitive element of the camera—an image sensor or a film—is exposed. A changing of the representation during the exposure can, again in particular in a camera having a rolling lens shutter or a rolling shutter, result in the originally displayed representation being recorded in some rows or regions of the light-sensitive element while the changed representation is already registered in the other rows. In the image ultimately generated by the camera, different representations of the virtual background can therefore be sectionally imaged so that the image can appear separated into two parts.

Due to the matching between the refresh times and the exposure pauses of the camera, such a so-called tearing effect can, however, be avoided by changing the representation only during the exposure pauses. During an exposure, unchanged representations of the virtual background can thus be recorded by means of the camera so that the same representation of the virtual background can in particular be imaged in each row of an image sensor.

To achieve this, a frame rate of the camera can, for example, first be synchronized with a refresh rate of the background display device—i.e. a frequency at which the background display device changes the representation of the virtual background. For this purpose, the frame rate can in particular correspond to the refresh rate or be selected as an integer multiple of the frame rate. Furthermore, a phase of the exposure time and/or of the exposure pause of the camera within an image recording can, for example, be defined such that the refresh times of the background display device fall into the exposure pauses of the camera. As an alternative to a setting at the camera, the refresh times at the background display device can also, for the synchronization with the exposure pauses of the camera, be offset in time with respect to the start of an exposure and/or of an exposure window of the camera such that the representation of the virtual background is changed in the exposure pauses of the camera. Such a match between the refresh times and the exposure pauses can in particular be achieved by linking the camera and the background display device in a network so that respective time signals of the camera and the background display device can be synchronized with one another via a corresponding network protocol, for example PTP (Precision Time Protocol). Since the frame rate of the camera and the refresh rate of the background display device can furthermore be selected identically, the refresh times and the exposure pauses can repeat at an identical frequency so that subsequent refresh times can also always fall into a respective exposure pause. This can also be achieved if the frame rate is selected as an integer multiple of the refresh rate. With such a match between the refresh rate and the frame rate, it can also be achieved that a subsequent refresh time falls into an exposure pause of the camera if the respective previous refresh time fell into an exposure pause.

Furthermore, the invention relates to a camera for a recording of a representation of a virtual background that is intermittently displayed in a virtual image recording studio in accordance with a light pulse frequency by means of an associated background display device. The camera comprises an interface for receiving a value of the light pulse frequency of the associated background display device, and a control device, wherein the control device is configured to control the camera in accordance with a settable exposure time. Furthermore, the control device is configured to determine a plurality of permitted exposure times in dependence on the received value of the light pulse frequency.

The interface of the camera can in particular be configured to receive the light pulse frequency of the background display device in a wired or wireless manner. For example, the interface of the camera can receive the light pulse frequency of the background display device directly from the background display device that can, for example, likewise have an interface for this purpose. Alternatively thereto, the light pulse frequency of the background display device can, for example, be inputtable through a user input at the camera so that the control device can determine the permitted exposure times based on a user input for transmitting the light pulse frequency of the background display device. For this purpose, the control device of the camera can in particular be connected to the interface of the camera. Furthermore, the control device can, for example, be configured as a CPU (Central Processing Unit) and/or a microprocessor.

Since the control device is configured to determine a plurality of permitted exposure times in dependence on the value of the light pulse frequency, it can in particular be achieved that, on a setting of a permitted exposure time during an exposure, the same number of light pulses is registered at different regions or rows of a light-sensitive element of the camera, for example a film or an image sensor, when the different regions are exposed to an incidence of light for the exposure time. For example, permitted exposure times can be determined such that an integer number of light pulses of the background display device can be registered during an exposure time. Due to such a match of the exposure time to the light pulse frequency of the background display device, modulations of the brightness in an image of the representation of the virtual background generated by the camera can in particular be avoided.

In some embodiments, the camera can have an electronic rolling lens shutter or a mechanical rolling lens shutter.

An electronic rolling shutter is described in DE 10 2010 035 811 A1, for example. Such an electronic rolling shutter can be formed by an image sensor that has a plurality of light-sensitive sensor elements arranged in rows and columns, wherein the image sensor is read out row-wise. To make this possible, the exposures of the individual rows can take place with a slight time offset so that respective exposure times of the individual rows are shifted in time without this time shift being directly related to the frame rate of the camera. Due to such a control of the image sensor, a mechanical rolling shutter can in particular be reproduced in which a mechanical lens shutter can be successively moved to close a diaphragm so that individual regions of a film or an image sensor of the camera are exposed at different times. Therefore, in such a mechanical rolling shutter, differences in the number of received light pulses can generally also occur at different positions of the film or of the image sensor. However, a rolling shutter can in particular be used in motion picture cameras for creating moving image recordings to be able to depict movements that appear natural in the image sequences generated.

In some embodiments, the camera can have an image sensor comprising a plurality of light-sensitive sensor elements. The image sensor can in particular be configured as a CMOS image sensor and/or have a pixel matrix that comprises a plurality of pixels arranged in a plurality of rows and in a plurality of columns. Each of the pixels can be configured to generate electric charge from light incident during an exposure. Furthermore, the image sensor can comprise a readout device that is configured to read out, row by row, the electric charge generated at the pixels of the pixel matrix during the exposure and to convert it into a respective digital pixel value. The pixel values of the pixel matrix can then be output as a digital data set. As already explained, an electronic rolling shutter can in particular be formed by such an image sensor read out row-wise.

In some embodiments, the control device can be configured to determine the permitted exposure times such that the permitted exposure times correspond to an integer multiple of the reciprocal of the light pulse frequency. The permitted exposure times can in particular be defined by an integer multiple of the reciprocal of the light pulse frequency greater than one.

For example, provision can be made to perform a recording at a frame rate of 24 Hz or 24 fps by means of the camera, while the background display device can be operated at a light pulse frequency of 1920 Hz. In this case, eighty light pulses can generally be generated per recorded image or in each image recording time. Therefore, in this example, eighty permitted exposure times can be determined, wherein the permitted exposure times have a respective duration of $n \times 1/1920$ Hz, where $n=1$ to 80.

Due to such a selection of the permitted exposure times, it can thus be achieved that an integer complete number of light pulses is registered in each exposure time. In particular for cameras having a rolling shutter, it can thereby be ensured that the same number of light pulses is detected in each region or in each row of the light-sensitive element—a film or an image sensor—during an exposure to avoid a modulation of the brightness in the image of the representation of the virtual background generated by the camera.

The control device of the camera can in particular be configured to determine all the exposure times as permitted exposure times that correspond to an integer multiple of the reciprocal of the light pulse frequency. However, the control device can be configured to consider an upper limit and/or a lower limit for the permitted exposure times and, for instance, to further process only exposure times that lie within the upper limit and/or the lower limit. At least only exposure times that are less than or equal to the image recording time can in particular be considered. This will be explained in more detail below.

In some embodiments, the control device can be configured to determine the plurality of permitted exposure times such that the permitted exposure times lie within a predetermined permitted range. In particular, only those integer multiples of the reciprocal of the light pulse frequency that lie within the predetermined permitted range can thus be considered. The control device can in particular be configured to consider limits of the settable exposure times. In addition to the already mentioned upper limit of the exposure time as the total image recording time, a lower limit can, for example, be defined in a camera-specific and/or a sensor-specific manner by a minimum exposure time that enables an image recording with signals that lie above a mere noise.

In some embodiments, the control device can be configured to determine the permitted exposure times computationally or by looking up in a table. For example, the control device can be connected to a memory, in particular a non-volatile memory and/or a semiconductor memory, in which respective permitted exposure times are stored for different light pulse frequencies. In the memory, a respective table can in particular be stored for different light pulse frequencies, in particular common light pulse frequencies, that comprises the exposure times permitted for this light pulse frequency. Alternatively thereto, the control device can also be configured to calculate a light pulse duration as a minimum permitted exposure time on the basis of the light pulse frequency in order thereupon to determine all the permitted exposure times as an integer multiple of the light pulse duration.

The control device can further be configured to control the camera in accordance with one of the determined permitted exposure times. For this purpose, the control device can in particular control an image sensor, or a readout of an image sensor, or a lens shutter such that individual rows or regions of a light-sensitive element of the camera, of a film, or of an image sensor are exposed in accordance with one of the determined permitted exposure times. In this regard, the control device can be configured to automatically set a permitted exposure time at the camera.

In some embodiments, the camera can further have a display device for transmitting information to a user and can be configured to display information about the determined permitted exposure times on the display device. For example, the camera can comprise a display on which such information is presented. The information can in particular be displayed on an electronic viewfinder of the camera or on a separate display that is arranged at an outer side of a housing of the camera. Such a display can in particular also be configured as a touchscreen so that a user can make settings directly at the display or the display device, for instance, to set the exposure time.

In some embodiments, the information can represent values of the permitted exposure times and/or values of opening angles of a lens shutter of the camera.

The permitted exposure times and/or a permitted exposure time whose integer multiples likewise represent permitted exposure times can thus in particular be directly displayed on the display device. However, for example for a rolling shutter, an opening angle of the lens shutter can also be displayed instead of an exposure time, wherein the respective opening angle can correspond to an angle whose share of 360° can correspond to a share of a permitted exposure time in the image recording time of the camera. In this regard, for example in the embodiment explained above with a light pulse frequency of 1920 Hz at a frame rate of 24 Hz, 80 light pulses can be generated per image recording so that an opening angle of a lens shutter that corresponds to a permitted exposure time can be defined by an integer multiple of 360°/80=4.5°.

In some embodiments, the control device can be connected to an input device that is configured to receive, through a user input, an exposure time to be set and to transmit the latter to the control device, wherein the control device can be configured to set the exposure time to be set at the camera. Such an input device can in particular also be connected to the interface of the camera in order, for example, to be able to transmit a value of the light pulse frequency of the background display device to the camera through a user input.

The input device can, for example, comprise a touch screen and/or knobs or buttons to enable the user input. The input device can, for example, also comprise a rotatable control wheel to be able to set an exposure time. The input device can in particular cooperate with the display device already mentioned above in that, for example, a touch screen can be configured both to display the information about permitted exposure times and to receive the user input.

The exposure time to be set can generally have any desired value and does not necessarily have to correspond to one of the determined permitted exposure times. The control device can therefore generally and in particular independently of a received light pulse frequency be configured to set an exposure time of the camera. However, the exposure time to be set of the camera can also be a selection of permitted exposure times, in particular if the permitted exposure times are displayed on a display device of the camera and the user selects such a permitted exposure time.

In some embodiments, the control device can further be configured to set the exposure time to be set only when the exposure time to be set is a permitted exposure time. In such embodiments, the user can consequently only choose between permitted exposure times, whereas the setting of a non-permitted exposure time can be prevented by the control device. However, this can in particular be achieved in that only the determined permitted exposure times, in particular considering respective limits, can be displayed on the display device and offered to the user for selection so that the user can anyway only set permitted exposure times. This can, for example, also be achieved in that the exposure time can be set stepwise at the camera, wherein the steps can be automatically settable to the reciprocal of the received light pulse frequency by means of the control device. For example, to set the exposure time at the camera, a stepwise rotatable control wheel can be provided in some embodiments for this purpose, in particular as part of the aforementioned input device, wherein the steps can be automatically settable to respective permitted exposure times by the control device.

Furthermore, in some embodiments, the control device can be configured to set a permitted exposure time that is closest to the exposure time to be set when the exposure time to be set is not a permitted exposure time. In such embodiments, the user can thus generally freely set an exposure time, wherein the control device can, however, possibly adapt the exposure time to be set to a permitted exposure time. It can thereby be achieved that the image generated by the camera is approximately generated with the exposure time desired by the user, but it is simultaneously ensured that all the regions or rows of a light-sensitive element of the camera register a constant number of light pulses during an image recording.

In some embodiments, the control device can be configured to automatically set a permitted exposure time in dependence on the light pulse frequency. For example, the control device can be configured to set a permitted exposure time that is closest to a currently set exposure time automatically after receiving the light pulse frequency of the background display device. It can thereby also be achieved that a presetting of the exposure time made by the user is considered in order, however, to simultaneously prevent unwanted modulations in the images of the representations of the virtual background due to unequal numbers of recorded light pulses in different regions or rows of a light-sensitive element.

The invention further relates to a background display device for a virtual image recording studio that is configured to display, behind a real subject, a representation of a virtual background for a recording by means of an associated camera. The background display device has a control device that is configured to control the background display device to intermittently display the representation of the virtual background in accordance with a settable light pulse frequency. The background display device further has an interface that is configured to receive a value of a set exposure time of the associated camera and the control device is configured to set the light pulse frequency of the background display device in dependence on the received value of the set exposure time of the associated camera.

Due to such a setting of the light pulse frequency by the control device of the background display device, it can ultimately be achieved that the light pulse frequency of the background display device is matched to the exposure time of the camera as well. In this case, the exposure time can, however, be completely freely selectable at the camera by ultimately performing the required adaptation at the background display device. The interface of the background display device can also be configured to receive the exposure time of the associated camera in a wireless or wired manner. Furthermore, the interface can be configured to receive the exposure time directly from the associated camera or the interface can be configured to receive the exposure time of the camera through a user input.

In some embodiments, the control device of the background display device can be configured to set the light pulse frequency such that the light pulse frequency corresponds to an integer multiple of the reciprocal of the received value of the set exposure time. It can thereby again be achieved that in particular each region and/or each row of a light-sensitive element of the camera, in particular a film or an image sensor, is acted on by the same number of light pulses during an exposure of the camera in order to avoid any brightness modulations in an image of the representation of the virtual background generated by the camera.

Also in connection with such a settable background display device, the associated camera can in particular have an electronic rolling lens shutter or a mechanical rolling lens shutter so that different regions or rows of a light-sensitive element of the camera can be exposed at different times. Furthermore, the camera can in particular have an image sensor comprising a plurality of light-sensitive sensor elements that are arranged in a plurality of rows and columns, wherein these rows can in particular be exposed row-wise and after one another for a respective constant exposure time.

The control device can further in particular be configured to set the light pulse frequency such that the light pulse frequency corresponds to an integer multiple of the reciprocal of the received value of the set exposure time greater than one. Furthermore, the control device can also be configured to consider an upper limit and/or a lower limit of the settable light pulse frequency.

In some embodiments, the control device of the background display device can be configured to automatically set the light pulse frequency of the background display device, or the control device can be configured to transmit information about permitted light pulse frequencies to a user in order to set one of the permitted light pulse frequencies in dependence on a user input. For this purpose, the background display device can in particular also have an input device and/or a display device to be able to transmit information to the user and/or receive user inputs. The display device and/or the input device can, for example, be configured as a display and/or a touchscreen.

In some embodiments, the background display device can comprise a plurality of actively illuminating picture elements, in particular light-emitting diodes, that form a two-dimensional arrangement. Furthermore, the background display device can have the features already explained above with respect to a background display device for a virtual image recording studio.

The invention further relates to a background display device for a virtual image recording studio that is configured to display, behind a real subject, a representation of a virtual background for a recording by means of an associated camera. The background display device has a control device that is configured to change the representation of the virtual background at settable refresh times. The background display device further has an interface that is configured to receive information about exposure pauses between consecutive exposures of the associated camera. The control device is configured to set the refresh times of the background display device in dependence on the received information about the exposure pauses of the associated camera.

The control device of the background display device can in particular be configured to change the representation of the virtual background at a predefined and/or settable refresh rate. In this connection, the control device can be configured, when changing or refreshing the representation of the virtual background, to change the included image information in accordance with the representation displayed by means of the background display device.

For example, the information about exposure pauses between consecutive exposures of the associated camera can comprise the exposure time and/or a frame rate of the associated camera. The interface of the background display device can further be configured to receive this information directly from the camera or through a user input. A communication between the camera and the interface of the background display device can in particular take place in a wireless or wired manner.

Furthermore, the information about the exposure pauses can comprise a point in time of a start of an exposure time and/or of an exposure window within an image recording of the camera and/or a phase position of the exposure time within an image recording time of the camera. During a recording by means of the camera in which the camera generates images of the representation of the virtual background at a predefined or settable frame rate, the exposure window can in this regard also be periodically repeated at the frame rate, wherein the exposure pauses are provided between the exposure windows. By transmitting information about the start of an exposure window and its duration, the exposure window can be located in time within an image recording in order, for example by a corresponding shifting of the refresh times with respect to the start of the exposure window and/or with respect to the end of the exposure window, to be able to achieve that the representation of the virtual background is changed outside the exposure window at the background display device. For this purpose, the representation of the virtual background can in particular be changeable by means of the control device of the background display device at a refresh rate that can correspond to the frame rate of the associated camera and/or to an integer share of the frame rate of the associated camera. Due to a single shifting of a refresh time with respect to an exposure window in order to move this refresh time into an exposure pause, it can hereby be ensured that the subsequent, periodically recurring refresh times also lie in exposure pauses of the associated camera.

To enable such a transmission of information about the exposure pauses of the camera to the background display device, the background display device and the camera can in particular be linked to one another in a network. Such a link can enable a synchronization of the refresh times and the exposure times via a corresponding network protocol, for example PTP (Precision Time Protocol), for which purpose the network can, in particular in addition to the camera and the background display device, comprise a time measurement device that can act as a reference clock (also referred to as a grandmaster clock). Alternatively thereto, a respective time measurement device of the camera or of the background display device can, however, also form the reference clock in the network. To control the synchronization between the camera and the background display device, a network control device can be provided that can, for example, comprise a microprocessor and that can be configured to determine corresponding delays between the time signals of the camera and/or the background display device with respect to the time signals of the reference clock and to approximate the time signals of the camera and/or the background display device to the time signals of the reference clock. Alternatively thereto, the control device of the background display device and/or a control device of the camera can, however, also be configured to perform the synchronization between time signals of the camera and time signals of the background display device. The control device of that one of the camera and the background display device that forms the reference clock in the network can in particular be configured to perform the synchronization.

Furthermore, in some embodiments, the control device of the background display device can be configured to set the refresh times such that a respective change of the representation of the virtual background takes place during an exposure pause of the associated camera.

As already explained, it can be achieved by such a control of the background display device that the representation of the virtual background does not change within an exposure or an exposure window of the associated camera to prevent two or more representations of the virtual background from being imaged in a single image. Rather, due to such a synchronization between the refreshing of the representation of the virtual background and the refreshing of the exposure pauses of the camera, an unchanged representation of the virtual background is displayed for the entire duration of an exposure so that a single representation of the virtual background can be imaged during each image recording.

In some embodiments, the received information about the exposure pauses of the associated camera can represent the start, or the start and the duration, of at least one exposure pause. The information can in particular represent the start, or the start and the duration, of at least a single exposure pause or of a series of consecutive exposure pauses. For example, the refresh times can thereby be settable by means of the control device of the background display device such that the representation of the virtual background is changed immediately after the start of an exposure pause and thus at a point in time at which the subsequent exposure has not yet started. When information about the start and the duration of the exposure pause is received, provision can in particular also be made to place the refresh times in the middle of an exposure pause to prevent possible imaging effects, for example, due to a slight fluctuation of the refresh rate.

The received information about the exposure pauses can in particular comprise information about a point in time of a respective exposure pause, or information about a frequency and a respective phase position of consecutive exposure pauses. The received information about the exposure pauses can additionally comprise information about a duration of a respective exposure pause. However, the received information about the exposure pauses can also comprise information about a frequency and a respective phase position of consecutive exposure times and information about a duration of a respective exposure time so that the points in time of consecutive exposure pauses can be indirectly determined therefrom.

In some embodiments, the background display device can comprise a plurality of actively illuminating picture elements, in particular light-emitting diodes, that form a two-dimensional arrangement.

The picture elements can in particular be arranged in a two-dimensional arrangement and/or a regular grid. Furthermore, the background display device can be configured as an LED and can comprise a plurality of light-emitting diodes, in particular LEDs (Light Emitting Diodes) or organic light-emitting diodes or OLEDs (Organic Light Emitting Diodes).

In some embodiments, the background display device can comprise a plurality of panels of the same kind at which a respective plurality of picture elements are arranged.

Furthermore, the background display device can have the features of a background display device for a virtual image recording studio that were explained above in connection with the synchronization of exposure times of the camera and light pulse frequencies of the background display device.

In some embodiments, the control device of the background display device can further be connected to a memory in which at least one next representation of the virtual background is stored, wherein the control device can be configured to display the stored next representation in order to change the representation of the virtual background.

For example, the control device can for this purpose comprise a driver for controlling one or more actively illuminating picture elements that comprises an internal buffer RAM. In this regard, the memory and/or the buffer RAM can form a shadow register into which a new image or the next representation of the virtual background can be written while a previous representation is still being displayed. Therefore, the next representation does not first have to be generated and transmitted to the control device over a long path; it can rather be changed directly and synchronously over the entire background display device by so-to-say keeping the respective next representation available in the memory. This can in particular enable a fast change of the representation of the virtual background in order to achieve that the representation can be reliably changed in an exposure pause of the associated camera.

Furthermore, the invention relates to a camera for a recording of a representation of a virtual background that is displayed in a virtual image recording studio by means of an associated background display device and that changes at refresh times. The camera has an interface that is configured to receive information about the refresh times of the associated background display device and the camera has a control device that is configured to control the camera in accordance with a settable exposure time. Furthermore, the control device is configured to set exposure pauses of the camera in dependence on the received information about the refresh times.

The exposure pauses of the camera can be directly or indirectly settable in particular by means of the control device. However, the exposure pauses of the camera can—directly or indirectly—in particular be settable such that the point in time and the duration of a respective exposure pause are defined and are synchronized with the refresh times of the associated background display device. To indirectly set the exposure pauses, in particular a frequency and a respective phase position of consecutive exposure times and/or exposure windows as well as a duration of a respective exposure time and/or of a respective exposure window can be set. Exposure pauses can in particular be periodically repeated at a settable frame rate, a frequency at which the camera generates recordings of the representation of the virtual background, wherein respective time periods of the consecutive exposure pauses can be determined by the respective phase position of the exposure pause with respect to a start of an image recording.

The synchronization between the exposure pauses and the refresh times can here also in particular take place via a network that comprises the camera and the background display device. A synchronization via PTP (Precision Time Protocol) can again in particular be provided.

In some embodiments, the control device of the camera can be configured to set the exposure pauses of the camera such that during a respective change of the representation of the virtual background an exposure pause of the camera takes place. In such embodiments, the background display device can consequently change the representation of the virtual background in an uninfluenced manner at the respective refresh time, wherein the control device of the camera can use the information about these refresh times to set the exposure pauses of the camera accordingly. This can in particular be achieved by a corresponding phase shift of an exposure window, during which an exposure of a light-sensitive element of the camera takes place, with respect to the refresh times of the background display device. The refresh times of the background display device can further in particular be periodically determined by a refresh rate of the background display device, while the exposure pauses can be determined by a frame rate of the camera. The frame rate and the refresh rate can in particular correspond to one another, wherein the control device of the camera can in particular also be configured to set the frame rate such that the frame rate corresponds to the refresh rate of the background display device or to an integer multiple of the refresh rate. For this purpose, the interface of the camera can in particular also be configured to receive the refresh rate or information about the refresh rate from the background display device.

The invention will be explained in the following purely by way of example with reference to embodiments and to the drawings.

Figure 2:
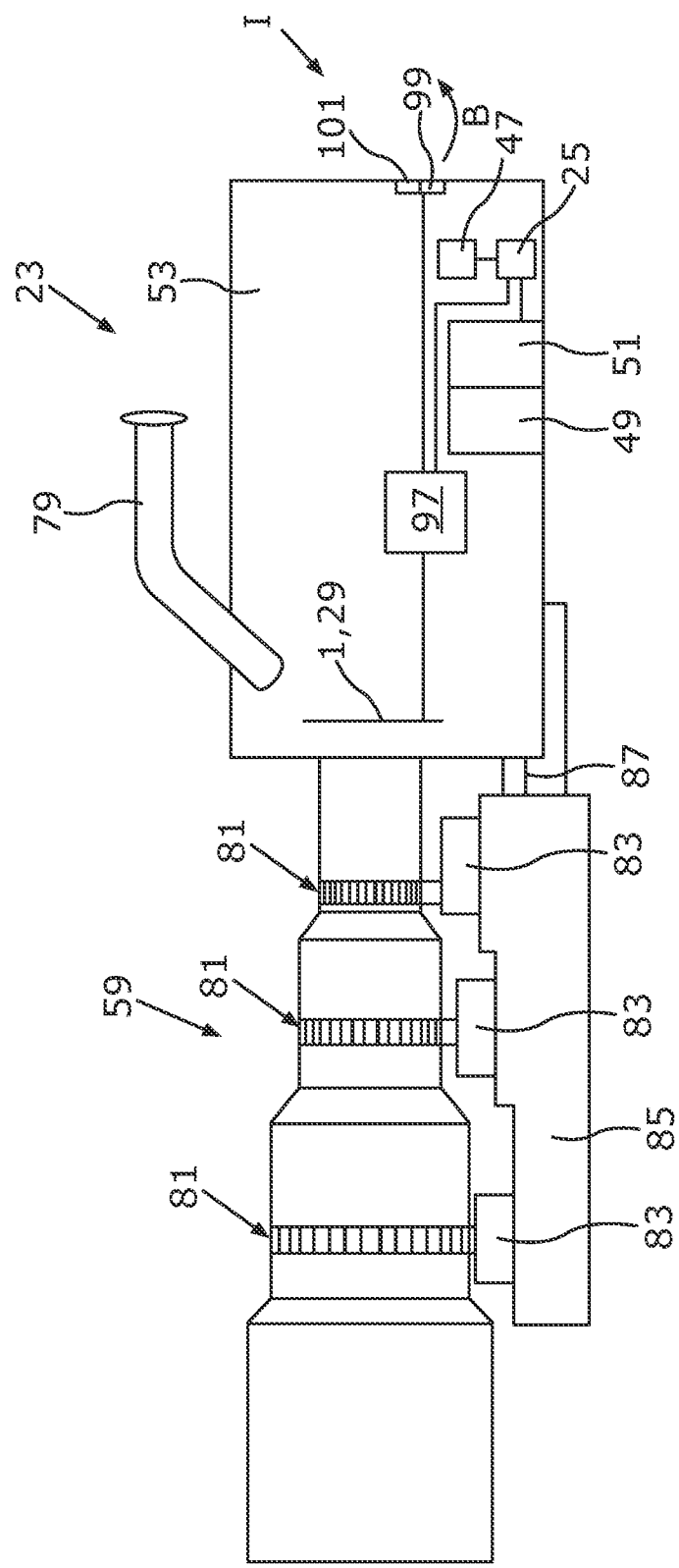
Figure 3:
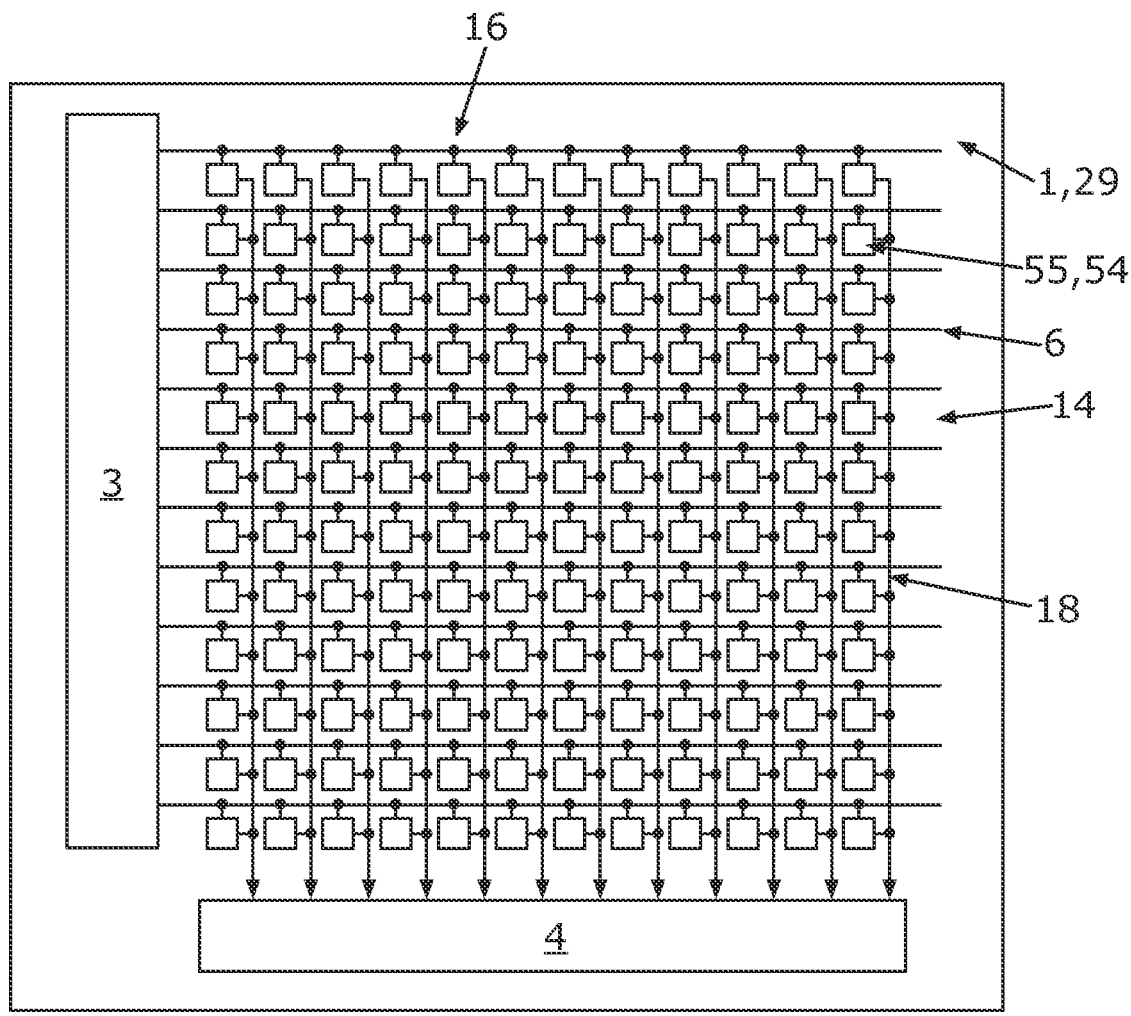
Figure 4A:
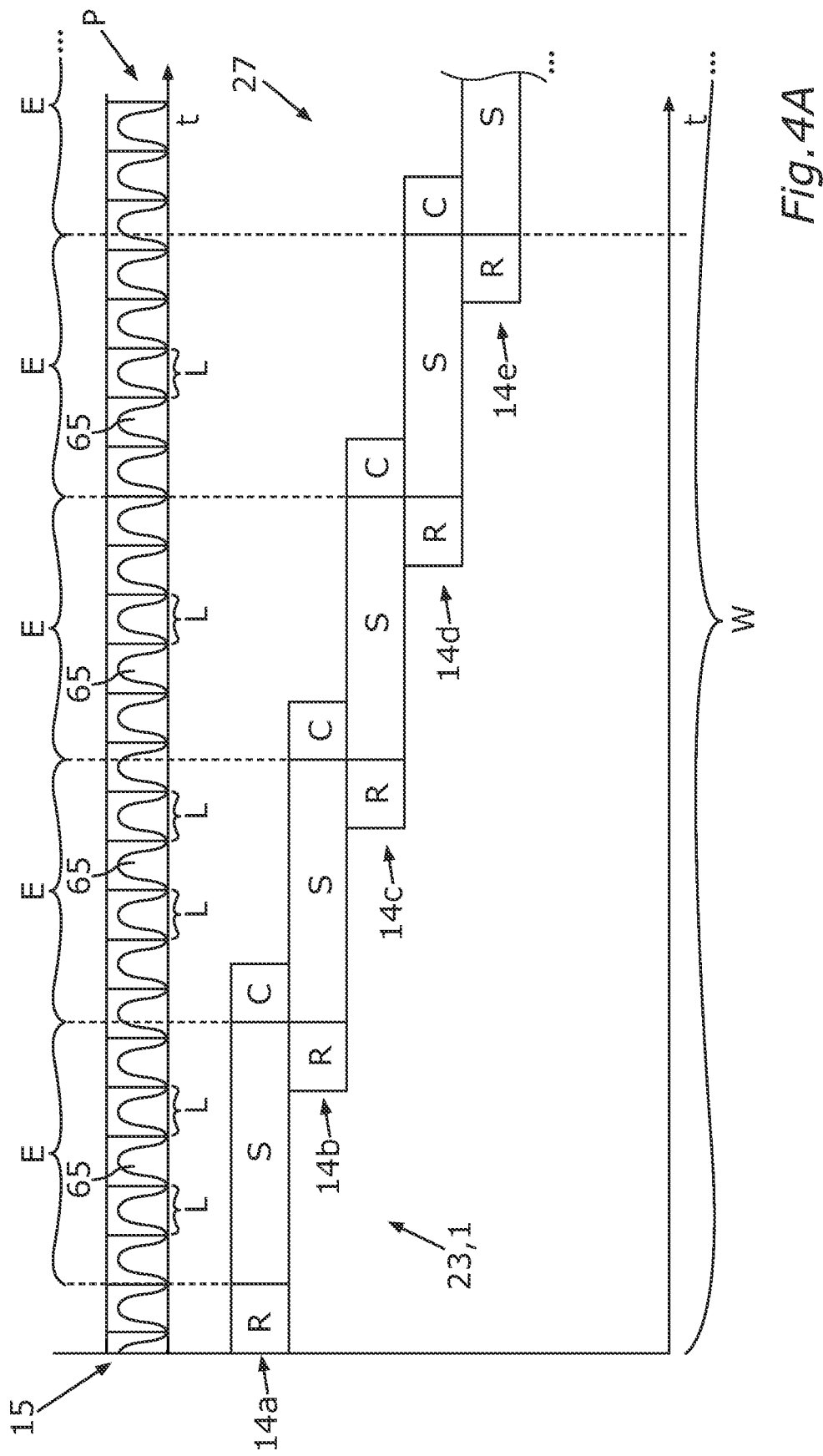
Figure 4B:
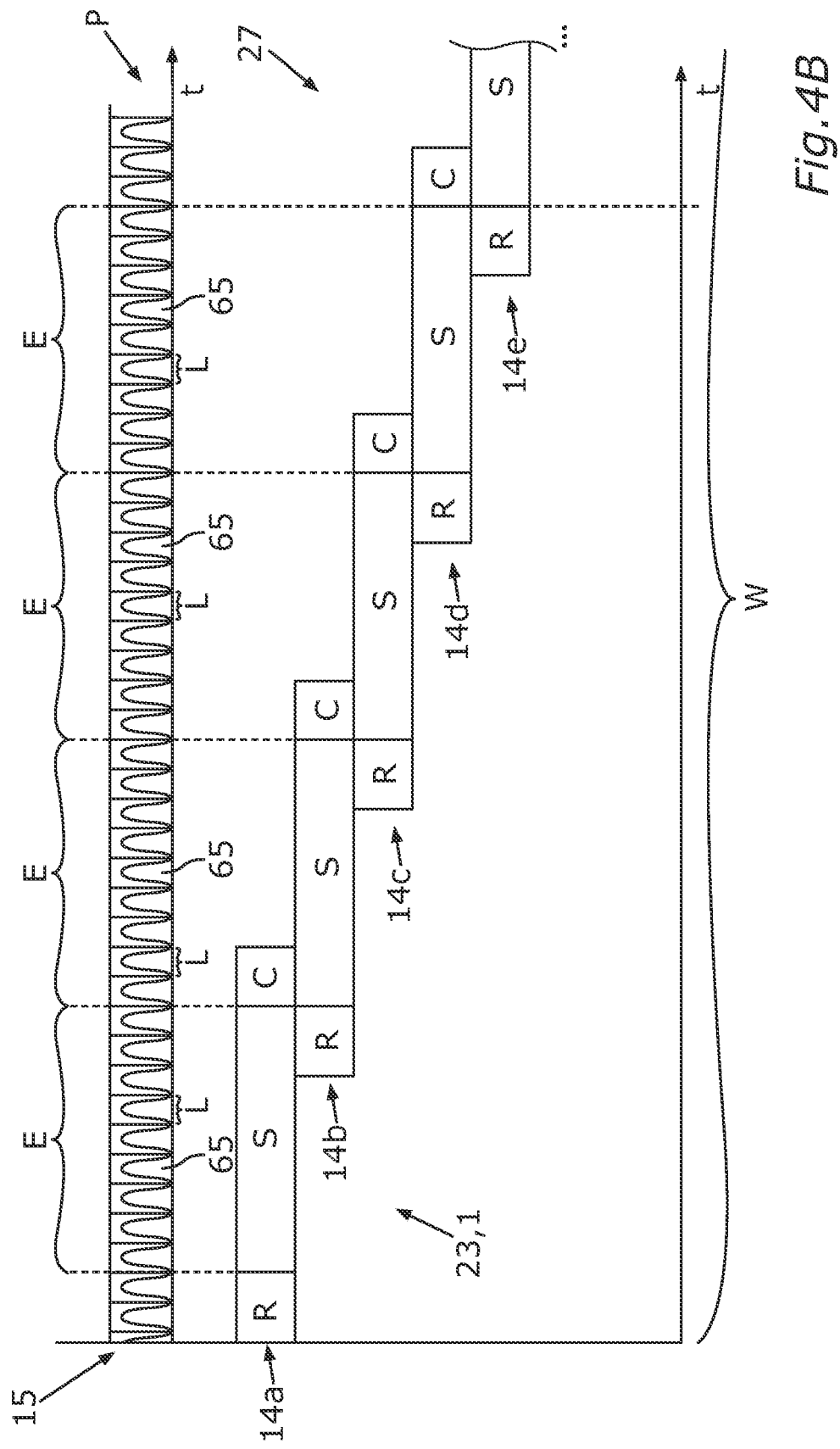
Figure 6A:
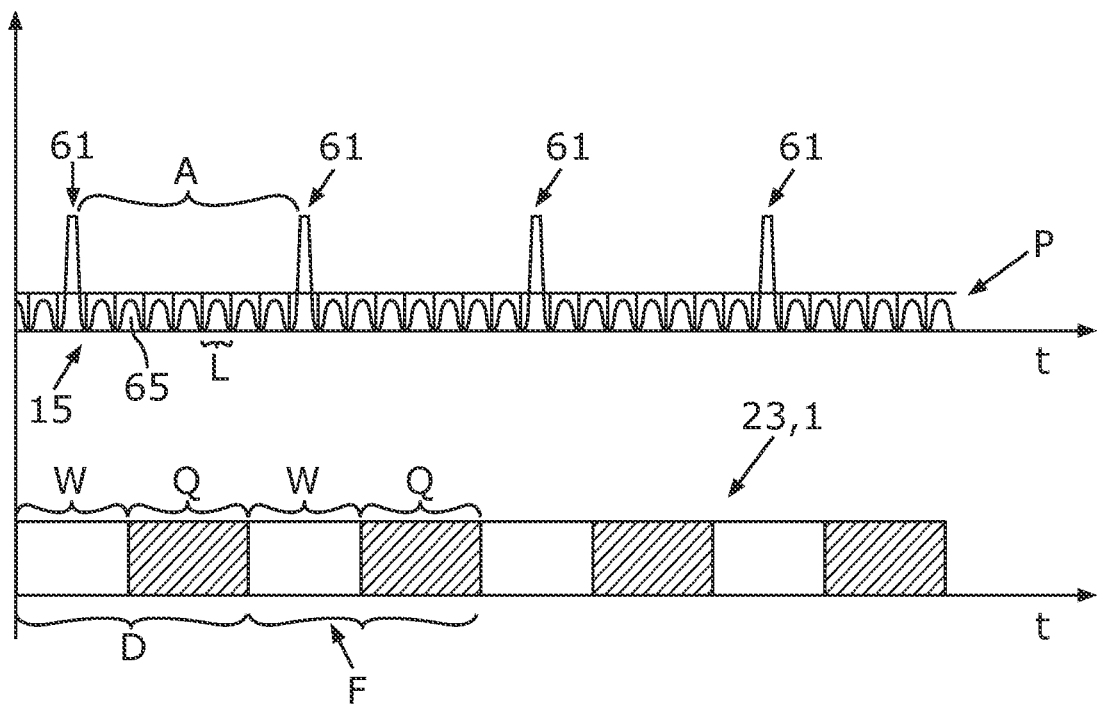
Figure 6B:
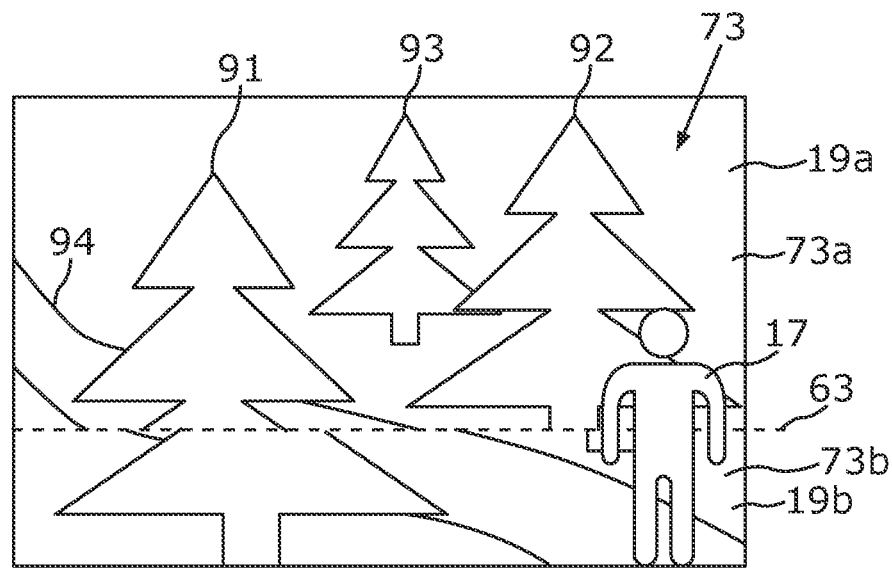
Figure 7A:
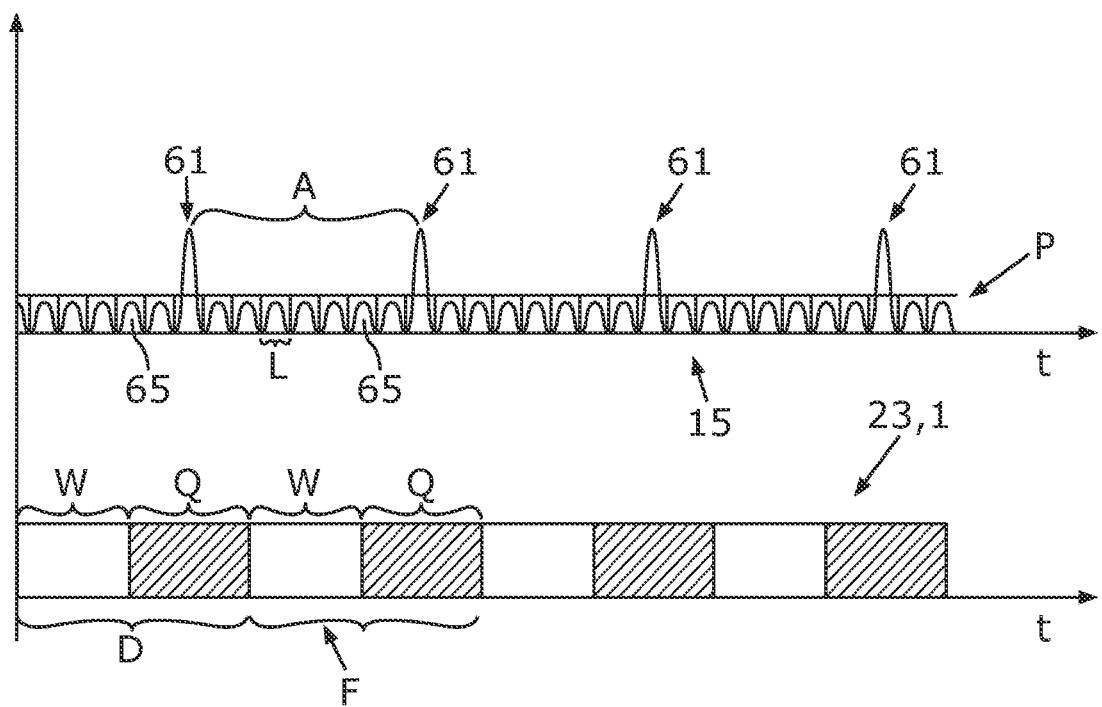
Figure 7B:
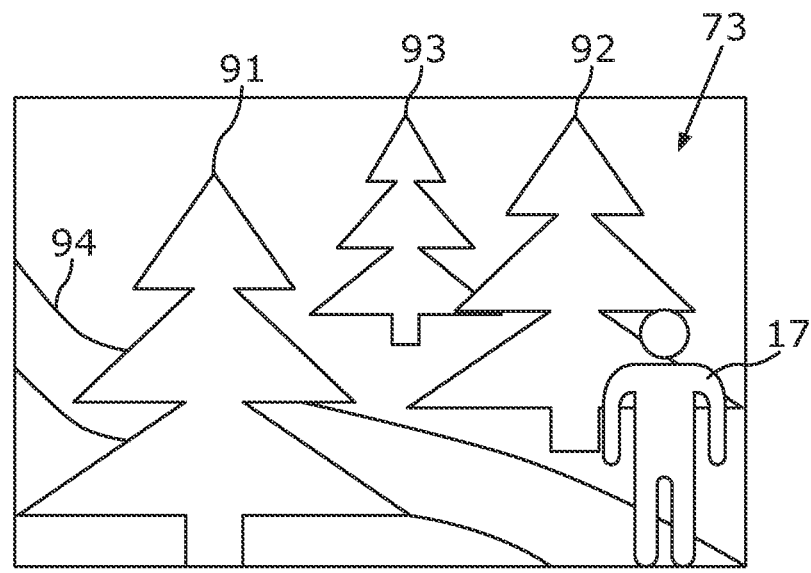

There are shown:

FIG. 1 a schematic representation of a recording system for an image recording studio with a background display device for displaying a representation of a virtual background and with a camera;

FIG. 2 a schematic representation of a camera provided for a recording in the image recording studio;

FIG. 3 a schematic representation of an image sensor of the camera;

FIGS. 4A and 4B a respective schematic representation for illustrating a row-wise readout of the image sensor and a superposition in time of the readout with light pulses generated by the background display device for displaying the representation of the virtual background;

FIGS. 5A to 5D a respective schematic representation for illustrating a mechanical rolling lens shutter;

FIGS. 6A and 6B a schematic representation for illustrating a time sequence for changing the representation of the virtual background and a tearing effect in an image of the representation of the virtual background generated by the camera; and FIGS. 7A and 7B a schematic representation for illustrating a synchronization in time of exposure pauses of the camera with refresh times of the background display device for changing the representation of the virtual background.

FIG. 1 schematically shows a virtual image recording studio 13, in which a scene, in particular in the form of a moving image recording and/or a photo recording, can be recorded by means of an associated camera 23. The camera 23 can, for example, be designed as a moving image camera in order to carry out moving images recordings that can be stored as a series of images generated by the camera 23. For this purpose, the camera 23 has a lens 59 that can in particular be designed as an interchangeable lens and that can selectively be connected to a housing of the camera 23. As a result, a respective lens 59, optimally adjusted to the environment in the image recording studio 13, can always be used in order to be able to generate the best possible recordings. An image sensor 53 comprising a plurality of light-sensitive sensor elements 55 can in particular be arranged in the housing of the camera 23, onto which sensor elements 55 light, which enters via a diaphragm aperture of a diaphragm, can be guided by means of a lens system or at least one lens to generate an image 73 (cf. also FIGS. 2 and 7B).

Furthermore, a background display system 11 having a background display device 15 is arranged in the image recording studio 13 and, together with the camera 23, forms a recording system 10. The background display device 15 comprises an active illumination apparatus 31 configured as an LED wall 33 and is configured to display a representation 19 of a virtual background 21 for a recording by means of the camera 23. For this purpose, the illumination apparatus 31 or the LED wall 33 has a plurality of actively illuminating picture elements 35 that are arranged next to one another in a two-dimensional arrangement. For example, the picture elements 35 can be configured as individually controllable light-emitting diodes 44 or as individually controllable light-emitting diode units, wherein each of such a light-emitting diode unit can comprise a plurality of light-emitting diodes 44, in particular three light-emitting diodes 44. Provision can in particular be made that the picture elements 35 are configured as light-emitting diode units having three respective light-emitting diodes 44, wherein one of the three light-emitting diodes 44 can emit red light, one light-emitting diode 44 can emit green light and one light-emitting diode 44 can emit blue light. The light-emitting diode unit can furthermore comprise a color mixer to be able to set a respective color and/or brightness emitted by the picture element 35 by a respective individual control of the light-emitting diodes 44 of a light-emitting diode unit. The light-emitting diodes 44 can, for example, be configured as LEDs or as organic light-emitting diodes 44 or OLEDs. Background display devices for displaying a representation of a virtual background that generate the representation by means of a rear projection can generally also be used in the image recording studio 13.

The background display device 15 comprises a plurality of panels 41. A respective plurality of the actively illuminating picture elements 35 are arranged at each panel 41 of the plurality of panels 41 so that a section of the representation 19 of the virtual background 21 can be displayed at each of the panels 41. The panels 41 are in particular rectangular and/or square and formed without edges so that the representation 19 of the virtual background 21 can also be displayed without visible interruptions at the transitions between panels 41. The panels 41 are further arranged in a two-dimensional matrix to form the background display device 15.

The representation 19 of the virtual background 21 reflects here, for example, a three-dimensional scene 43 with objects 91, 92, 93 and 94, three trees and a path, which can be generated by appropriate control of the picture elements 35, in particular, by an appropriate setting of their respective color and brightness. The three-dimensional scene 43 is projected onto the essentially two-dimensional arrangement of the picture elements 35 of the illumination apparatus 31, wherein, in particular, the objects 91, 92 and 93 appear at a different distance to the illumination apparatus 31 or the background display device 11, in order to recreate the three-dimensionality of a real background corresponding to the virtual background 21.

In particular, the representation 19 of the virtual background 21 by way of the background display device 15, serves to generate a background for a recording of a real subject 17, for example an actor, in front of which a recording can be made or a film scene can be played. As a result, basically any kind of landscapes, spaces or environments can be created in the image recording studio 13, in front of, or, in which, a scene, for example, for a movie, is to be filmed. It is furthermore possible, by a time-variable control of the picture elements 35, to show movements in the virtual background 21, for example, a passing car, to which the actor 17 can react in an easy and improved manner compared to a scene in front of a green screen.

The background display device 15 extends here essentially in the vertical direction so that the actor 17 can move in front of the virtual background 21. However, in order to be able to depict the virtual background 21 more extensively, the background display device 15 can also extend around or above the actor 17, wherein the background display device 15 above the actor 17 can exhibit, in particular, a horizontal orientation. In order to be able to surround the actor 17 or to generate a transition from the shown vertical orientation to a horizontal orientation, the background display device 15 or the illumination apparatus 31 or the LED wall 33 can also be at least sectionally arched or curved.

In addition to representing the virtual background 21, the background display device 15 can also serve to illuminate the real subject 17 and thereby facilitate, for example, a further studio lighting for the image recording studio 13. Furthermore, by illuminating the real subject 17 by means of the background display device 15, the interaction of the real subject 17 or the actor 17 with light sources present in the virtual background 21, for example, lanterns or lamps, can be improved in that the real subject 17 casts a shadow which corresponds to the light conditions visible in an image generated by the camera 23.

To be able to generate the representation 19 of the virtual background 21 and to control the picture elements 35 to display the representation, the background display device 15 has a control device 37 (e.g. a microprocessor or a central processing unit, CPU) that is connected to a memory 39. A model of the virtual background 21 can in particular be stored in the memory 39 so that the control device 37 can generate the virtual background 21 based on the model. Furthermore, the control device 37 can be configured to project the virtual background 21 onto the background display device 15 and in particular the two-dimensional arrangement of the picture elements 35.

In order also to be able to display time-variable representations 19 of the virtual background 21 on the background display device 15 as directly as possible and without a time loss, at least one next representation 19b can be stored in the memory 39, wherein the control device 37 can be configured to display the next representation 19b stored in the memory 37 in order to change the representation 19 of the virtual background 21 (cf. also FIG. 6B). In particular, the next representation 19b thus does not first have to be generated when the display is to take place, but the control device 37 can directly control the picture elements 35 to display the next representation 19b. For example, the control device 37 can be configured, during the display of a representation 19, to generate the next representation 19b of the virtual background 21 based on the model stored in the memory 39 and to write it into the memory 39 to be able to directly access the next representation 19b when the display is required.

To further enable a communication between the components of the recording system 10, the background display device 15 has an interface 103 via which information I can be received from the associated camera 23. This information I can, for example, be directly transmittable from the camera 23 via a wireless and/or wired connection or can be inputtable through a user input at the interface 103. Information I about an exposure time E and/or an exposure pause Q between two exposures of the associated camera 23 can in particular be transmittable to the background display device 15 via the interface 103, as will be explained in more detail below.

A possible embodiment of the associated camera is schematically shown in FIG. 2. The camera 23 has a camera body 53 to which a lens 59 is fastened. The lens 59 can in particular be configured as an interchangeable lens so that selectively various configured lenses 59 can be connected to the camera body 53 and a lens 59 that is optimal for a respective recording can always be selected. The lens 59 has three lens rings 81 by means of which the respective parameters of the lens 59 can be set. For example, a focusing distance, a focal length, a zoom factor and/or a diaphragm aperture, in particular an aperture of an iris diaphragm, can be set or adapted by rotating a respective one of the lens rings 81. The camera 23 can in particular be configured as a motion picture camera or moving image camera to be able to consecutively generate a sequence of images 73 that can, for example, be played as a film.

To be able to adjust the lens rings 81, a lens ring drive unit 85 is connected to the camera body 53 via a holding rod 87 and comprises a respective lens setting motor 83 for each of the lens rings 81. The lens rings 81 can be rotated by means of these lens setting motors 83 and adjustments to the lens 59 can be made as a result. In particular, the lens ring drive unit 85 can be actuated remotely so that said lens parameters can be set or changed remotely.

At the camera body 53, a further display device 49 is arranged via which information I about settings of the camera 23 can be displayed to a user. The display device 49 can in particular be a display. The camera 23 furthermore has an input device 51 which is arranged at the camera body 53 and via which the user can make settings of the camera 23. An exposure time E of the camera 23 can in particular be settable at the input device 51, wherein a control device 25 connected to the input device 51 can be configured to control the camera 23 in accordance with the input exposure time E. The display device 49 and the input device 51 can in particular be formed by a touch screen via which both information I can be displayed to the user and user inputs can be received.

In order to generate an image of incident light through the lens 59, the camera 23 further comprises an image sensor 1 arranged within the camera body 53. This image sensor 1 can be configured based on, for example, CMOS technology or CCD technology and comprise a plurality of light-sensitive sensor elements 55 that can be arranged in a plurality of rows 14 and columns 16 (cf. also FIG. 3). Furthermore, the camera 23 has a readout circuit 97 that is configured to read out, process and digitize the signals of the respective sensor elements 55 and to output them to or via a signal output 99. For this purpose, the readout circuit 97 can in particular comprise amplifiers, multiplexers, analog-digital converters, buffer memories and/or microcontrollers. Ultimately, an image data set B can thus be generated by the camera 23, which corresponds to the image or an image of a field of view of the camera 23, and the image data set B can be output via the signal output 99. In order to check the field of view of the camera 23 and to be able to align the camera 23 onto a respective image section, a viewfinder 79, through which a cameraman can look through, is also arranged on the camera body 53.

Furthermore, the camera 23 has an interface 101 for receiving information I and/or data from the background display device 15, wherein a wireless and/or wired communication or a user input can again be provided. The received information I can in particular comprise refresh times 61 at which the background display device 15 changes the representation 19 of the virtual background 21, or a light pulse frequency P of the background display device 15 in accordance with which the background display device 15 intermittently displays the representation 19 of the virtual background 21. This is also explained in more detail below.

FIG. 3 shows an exemplary representation of the image sensor 1 of the camera 23. The image sensor 1 has a plurality of pixels 54 arranged in rows 14 and columns 16, wherein each pixel 54 forms a light-sensitive sensor element 55 to convert light incident during an exposure into electric charge (cf. FIG. 3). The readout of such an image sensor 1 can, for example, take place row-wise, for which purpose a row addressing logic 3 is provided. For this purpose, the sensor elements 55 of a row 14 can be coupled via a row selection line 6 to a respective column line 18 that is associated with the pixels 54 arranged in a column 16. The signals of the light-sensitive sensor elements 55 of a row 14 can be transmitted via the column lines 18 to a column amplifier 4 by means of which the signals generated can be amplified and can thereupon be processed further, in particular digitized.

The time sequence with respect to a time t of such a row-wise readout of the image sensor 1 is illustrated in the lower section of FIG. 4A. The readout of the image sensor takes place such that the charges of the light-sensitive sensor elements 55 are first reset or cancelled in a first row 14a of the image sensor 1 in a step R in order to achieve that only light incident on the sensor elements 55 during a defined exposure time E is considered in the image data set B output by the camera 23. After the sensor elements 55 have been reset, the sensor elements 55 arranged in the row 14a are exposed for the exposure time E so that, in the step S taking place during this time, electric charge is generated at the sensor elements 55 in dependence on the light incident during the exposure time E. After the defined exposure time E, a step C follows in the initially controlled row 14a, in which step C the electric charges generated at the sensor elements 55 of the row 14a during the exposure time E are read out. For this purpose, the row 14 can be coupled to the column line 18 (cf. also FIG. 3).

To minimize the readout time for the image sensor 1 as far as possible, the sensor elements 55 arranged in the subsequent row 14b are already reset in the step R while charge is still being generated at the sensor elements 55 of the row 14a. In this respect, the reset R of the row 14b is matched to the exposure time E such that the reset R of the sensor elements 55 in the row 14b is completed just when the step S for generating the electric charge is completed for the sensor elements 55 of the row 14a. This makes it possible to expose the sensor elements 55 of the row 14b, for the exposure time E again, as soon as the readout C of the generated electric charge starts for the sensor elements 55 of the row 14a and to read out the sensor elements 55 of the row 14b after the exposure time E by coupling them to the column line 18. These steps R, S and C for reading out the image sensor 1 are then successively carried out in the subsequent rows 14c, 14d and 14e and in the further rows 14 of the image sensor 1, which are not shown in FIG. 4, in order finally to generate an image 73 of the representation 19 of the virtual background 21 or an image data set B.

Due to this row-wise readout of the image sensor 1, the camera 23 is operated with an electronic rolling lens shutter 27 or electronic rolling shutter since the individual rows 14a, 14b, 14c, 14d and 14e are exposed with a time offset from one another and the respective exposure times E of the individual rows 14a, 14b, 14c, 14d and 14e are shifted with respect to one another by the exposure time E. In particular when the camera 23 is used to create moving image recordings, such an electronic rolling shutter 27 can be provided to be able to depict a natural motion sequence in images 73 generated by the camera 23 or in a sequence of such images 73. In such a rolling lens shutter 27, in addition to the exposure time E with which the individual rows 14a, 14b, 14c, 14d and 14e are exposed, an exposure window W can also be associated with the image sensor 1, said exposure window W defining the duration or the time interval from the starting point in time of the exposure of a first sensor element 55 or of the first row 14a up to an end point in time of the exposure of a last sensor element 55 or of a last row 14 of the image sensor. In the electronic rolling lens shutter 27 shown in FIG. 4A, the exposure window W of the image sensor 1 is in this regard longer than the exposure time E.

In the upper section of FIG. 4A, it is furthermore illustrated that the control device 37 of the background display device 15 can be configured to control the background display device 15 to intermittently display the representation 19 of the virtual background 21 in accordance with a settable light pulse frequency P. In this regard, the representation 19 can so-to-say be displayed in a pulsating manner, wherein a plurality of light pulses 65 can be displayed during each exposure time E so that a light pulse duration L of the individual light pulses 65 can be less than the exposure time E of the rows 14 of the image sensor 1. Furthermore the light pulse frequency P can in particular be synchronized with a frame rate F of the camera 23 in that the light pulse frequency P can correspond to a multiple of the frame rate F (cf. also FIGS. 6A and 7A). For example, the image recording rate F of the camera 23 can also be referred to as the frame rate and can indicate how many images the associated camera 23 generates per second. For example, at a common frame rate of 24 fps or 24 Hz, provision can be made that the light pulse frequency P corresponds to 1920 Hz or 3840 Hz.

While the light pulse frequency P can therefore be synchronized with the frame rate F of the camera 23, the exposure time E of the camera 23 is generally freely selectable and is not directly predefined by the frame rate F or an image recording time D that corresponds to the reciprocal of the frame rate F. Accordingly, even when there is a match between the light pulse frequency P and the frame rate F, there is generally no direct synchronization between the exposure time E and the light pulse frequency P. However, as FIG. 4A illustrates, this can in particular in the case of a rolling shutter 27 have the result that each of the rows 14a, 14b, 14c, 14d and 14e of the image sensor 1 registers a different number of light pulses 65 or different portions of incomplete light pulses 65 during the respective exposure time E. The rows 14a, 14b, 14c, 14d and 14e of the image sensor 1 can thus be exposed to different extents by the background display device 15 so that unwanted brightness modulations can appear in the image 73 of the representation 19 of the virtual background 21 generated by the camera 23 in that, for example, different rows of the image 73 can have different brightnesses due to the different number of detected light pulses 65.

The same problem can generally also arise with a camera 23 having a mechanical rolling lens shutter 27, as is illustrated by means of FIGS. 5A to 5D. In the case of such a mechanical rolling lens shutter 27, an opening 28 can be provided that is successively moved over a light-sensitive element 29 of the camera 23, for example an image sensor or a film, so that different regions 30 and 30a of the light-sensitive element 29 are released for an incidence of light by the opening 28 at different points in time. In FIG. 5A, the light-sensitive element 29 is in this respect completely covered by the lens shutter 27, whereas, in FIG. 5B, the lens shutter 27 has already been moved so far along the direction of an arrow 105 that a first region 30 of the light-sensitive element 29 can be exposed. In FIG. 5C, the entire light-sensitive element 29 is arranged in alignment with the opening 28 so that the entire light-sensitive element 29 is exposed to light. In FIG. 5D, the lens shutter 27 has, in contrast, again moved further so that the first region 30 is already covered by the shutter 27, whereas a last region 30a of the light-sensitive element 29 can still be exposed. Also in the case of such a mechanical rolling lens shutter 27, the regions 30 and 30a are thus indeed exposed for the same exposure time E, but at different points in time, so that the modulation explained above can here also occur in an image 73 generated by the camera 23 due to different numbers of registered light pulses 65 or different portions of not completely registered light pulses 65 at the regions 30 and 30a.

To counter this problem, provision can in particular be made to set the exposure time E of the camera 23 in dependence on the light pulse frequency P of the background display device 15 or to set the light pulse frequency P of the background display device 15 in dependence on the exposure time E of the camera 23 such that the exposure time E corresponds to an integer multiple of the reciprocal of the light pulse frequency P. The exposure time E can in particular accordingly be set such that the exposure time E corresponds to an integer multiple of a light pulse duration L, wherein this integer multiple can in particular be greater than one. This is illustrated by means of FIG. 4B.

As FIG. 4B shows, it can be achieved by such an adaptation of the exposure time E that, during each exposure time E, an integer number of complete light pulses 65 is registered that can in particular be greater than one. In the representation shown, the synchronization between the exposure time E or respective starting points of the exposure in the rows 14a, 14b, 14c, 14d and 14e and the light pulses 65 is selected such that the sensor elements 55 of each row 14 of the image sensor 1 register an integer number of always complete light pulses 65. However, even if the start of the exposure time E is shifted with respect to the start of a light pulse 65, i.e. a portion of the first light pulse 65 registered in a row 14 is cut off, by selecting the exposure time E such that the exposure time E corresponds to an integer multiple of the reciprocal of the light pulse frequency P, it can be achieved that just the portion of a light pulse 65 cut off at the start of the exposure time E is still registered in the respective row 14, and correspondingly in each of the rows 14 of the image sensor 1, at the end of the exposure time E. In this regard, it can be ensured by such a selection of the exposure time E that the same number of complete light pulses 65 is registered in each row 14 of the image sensor 1 and the above-explained modulations in the image 73, which the camera 23 generates of the representation 19 of the virtual background 21, can be avoided.

As already mentioned above, to enable such a setting of the exposure time E and/or of the light pulse frequency P, the camera 23 can have an interface 101 for receiving information I from the background display device 15. Furthermore, the background display device 15 can have an interface 103 for receiving information I from the camera 23. For example, provision can be made that the control device 25 of the camera 23 is configured to determine a plurality of permitted exposure times E in dependence on a received value of the light pulse frequency P. In this regard, the light pulse frequency P can be transmittable to the control device 25 of the camera 23 via the interface 101 and the information I, wherein this can, for example, take place directly by a communication with the background display device 15 or through a user input. The control device 25 can then be configured to determine the permitted exposure times E as those exposure times E that correspond to an integer multiple of the reciprocal of the light pulse frequency P or to an integer multiple of the light pulse duration L. For this purpose, the control device 25 can, for example, be configured to calculate the permitted exposure times E or to look them up in a memory 47 to which the control device 25 is connected. As already explained, it can be achieved for such permitted exposure times E that the same number of light pulses 65 is registered in each row 14 of the image sensor 1 or in each region 30 or 30a of a light-sensitive element 29. Thus, at a frame rate of 24 fps or 24 Hz and a light pulse frequency P of 1920 Hz, it, for example, results that a total of 80 light pulses 65 are generated per recorded image by the background display device 15 so that 80 permitted exposure times E having a respective duration of n×1/1920 Hz, where n is equal to 1 to 80, can be determined in this case.

To also set a permitted exposure time determined in this way at the camera 23, the control device 25 of the camera 23 can, for example, be configured to automatically set a permitted exposure time E. For example, the control device 25 can set that permitted exposure time E that is closest to a currently set exposure time E. Furthermore, the control device 25 can also be configured to display the determined permitted exposure times E on the display device 49 of the camera 23 so that a user can select one of the permitted exposure times E himself, in particular by means of the input device 51, and can transmit it to the control device 25. The control device 25 can then set the set permitted exposure time E at the camera 21. However, the control device 25 can also be configured to set an exposure time E set by a user at the input device 51 only when this set exposure time E corresponds to a permitted exposure time E. Otherwise, the control device 25 can, for example, set that permitted exposure time E that is closest to the exposure time E set by the user. However, provision can also be made that, after a determining of permitted exposure times E, only permitted exposure times E can be set at the input device 51 by means of the input device 51. For example, a grid of permitted exposure times E, from which the user can choose via the input device 51, can be displayed on the display device 49 for this purpose. Provision can also be made that exposure times E can be set step-wise by means of the input device 51, wherein the control device 25 can be configured to set the steps to permitted exposure times E.

As an alternative to a setting of the exposure time E at the camera 23, provision can also be made that the control device 37 of the background display device 15 receives information I about the exposure time E of the camera 23 via the interface 103 and sets the light pulse frequency P in dependence on the value of the received exposure E set at the camera 23. For example, the control device 37 of the background display device 15 can be configured to set the light pulse frequency P such that the light pulse frequency P corresponds to an integer multiple of the reciprocal of the received value of the set exposure time E. Due to such a setting of the light pulse frequency P, it can also be achieved that ultimately an integer number of light pulses 65 is registered in each of the rows 14 of the image sensor 1 of the camera 23 during the set exposure time E. An adaptation of the light pulse frequency P at the background display device 15 furthermore makes it possible that a cameraman can set the exposure time E freely and without restriction at the camera 23, for example, by means of the input device 51, wherein it can be ensured by an adaptation of the light pulse frequency P at the background display device 15 that, at the set exposure time E, each row 14 of an image sensor 1 or each region 30 or 30a of a light-sensitive element 29 of the camera 23 registers the same number of light pulses 65 during an exposure. The setting of the light pulse frequency P can again take place automatically or different permitted light pulse frequencies can be displayed to make a setting of a permitted light pulse frequency possible for a user.

A further problem with respect to the synchronization between the background display device 15 and the camera 23 can arise in that the background display device 15 can be configured to display changing representations 19 of the virtual background 21. For example, provision can be made that the control device 37 of the background display device 15 is configured to change the representation 19 at a predefined or settable refresh rate A in order, for example, to be able to show movements in the virtual background 21. For this purpose, as FIG. 6A illustrates, the representation 19 can be changed at respective refresh times 61. The refresh rate A can again in particular be synchronized with the frame rate F of the camera 23 so that a respective representation 19 of the virtual background 21 can generally be associated with each image 73 which the camera 23 generates of the representation 19 of the virtual background 21.

Here, too, the problem, however, arises that the exposure window W of the camera 23 already mentioned above, i.e. a time window during which at least one respective region 30 or 30a of a light-sensitive element 29 or a row 14 of an image sensor 1 is exposed to light, is predefined by the set exposure time E and is not generally linked to the frame rate F or the image recording duration D. Therefore, even if the refresh rate A of the background display device 15 is synchronized with the frame rate F of the camera 23, a so-called tearing effect can occur in images 73 of the background display device 15 generated by the camera 23 when the refresh rates 61 fall in time into the exposure window B of the image sensor 1 or of the light-sensitive element 29, for example a film, of the camera 23.

As FIG. 6B shows, such a tearing effect can in particular be reflected in that, in the image 73 generated by the camera 23, a first representation 19a of the virtual background 21 is imaged into a first region 73a while, after a change 63 of the representation 19 of the virtual background 21 falling into the exposure window W, the subsequent representation 19b of the virtual background 21 is already imaged in a region 73b of the image 73, wherein the representation 19b is here, by way of example, shown shifted with respect to the representation 19a. In this regard, the image 73 can be perceived as torn into the regions 73a and 73b.

In order to also avoid this effect, provision can be made to set the exposure pauses Q of the camera 23 in dependence on the refresh times 61 of the background display device 15 or to set the refresh times 61 of the background display device 15 in dependence on the exposure pauses Q of the camera 23 such that a respective change 63 of the representation 19 of the virtual background 21 takes place during an exposure pause Q of the camera 23. This is illustrated by means of FIG. 7A.

For this purpose, provision can in particular be made that the interface 103 of the background display device 15 is configured to receive information I about the exposure pauses Q from the camera 23, wherein the control device 37 of the background display device 15 can be configured to set the refresh times 61 in dependence on the received information I about the exposure pauses Q of the associated camera 23 and in particular to set them such that the refresh times 61 are located in time within the exposure pauses Q. For this purpose, the information I about the exposure pauses Q can, for example, represent the start, or the start and the duration, of at least one exposure pause Q. In this regard, the information I can, for example, comprise a specific point in time of a respective exposure pause Q and/or the frame rate F so that the subsequent exposure pauses Q can be determined based on the point in time of a first exposure pause Q. Furthermore, the information I can comprise a phase position of the exposure pause Q and the frame rate F so that the time position of the consecutive exposure pauses Q, which can likewise be repeated at the frame rate F, can be determined again. Furthermore, the information I can comprise information about the exposure time E and/or a duration of the exposure window W to be able to determine the exposure pause Q as a time window lying between two consecutive exposure windows W. Since the control device 37 can thus so-to-say move the refresh times 61 into the exposure pauses Q of the camera 23, a tearing effect in the image 73 generated by the camera 23 can be avoided and it can be achieved that all the rows 14 of the image sensor 1 or all the regions 30a and 30b of the light-sensitive element 29 of the camera 23 register the same representation 19 (cf. FIG. 7B).

As an alternative to a setting of the refresh times 61 at the background display device 15, provision can also be made that the interface 101 of the camera 23 is configured to receive information I about the refresh times 61 of the background display device 15. Accordingly, the control device 25 of the camera 23 can be configured to set the exposure pauses Q of the camera 23 in dependence on the received information I about the refresh times 61. For example, the control device 25 of the camera 23 can be configured to define a phase position of the exposure pauses Q within the image recording time D such that the exposure pause Q overlaps in time with the refresh time 61. By synchronizing the frame rate F of the camera 23 and the refresh rate A of the background display device 15, it can then be achieved that all the refresh times 61 of the background display device 15 fall into respective exposure pauses Q of the camera 23. Accordingly, a tearing effect can also be avoided by such a control of the camera 23.

To achieve a reliable synchronization between the time control of the background display device 15 and the exposure times E of the camera 23, provision can in particular be made that the camera 23 and the background display device 15 are linked to one another via a network. Such a link can, for example, make it possible to synchronize time signals of the camera 23 and the background display device 15 with one another via a corresponding network protocol, for instance PTP (Precision Time Protocol), in order in particular to be able to reliably bring the refresh times A of the background display device 15 into a time overlap with exposure pauses Q of the camera 23.

REFERENCE NUMERAL LIST

1 image sensor
3 row addressing logic
4 column amplifier
6 row selection line
10 recording system
11 background display system
13 image recording studio
14 row
15 background display device
16 column
17 real subject, actor
18 column line
19 representation
19a representation
19b representation
21 virtual background
23 camera
25 control device
27 rolling lens shutter
28 opening
29 light-sensitive element
30 region
30a region
31 illumination apparatus
33 LED wall
35 picture element
37 control device
39 memory
41 panel
43 three-dimensional scene
35 light-emitting diode
47 memory
49 display device
51 input device
53 camera body
54 pixel
55 light-sensitive sensor element
59 camera lens, interchangeable lens
61 refresh time
63 change of the representation
65 light pulse
73 image
73a region of the image
73b region of the image
79 viewfinder
81 lens ring
83 lens setting motor
85 lens ring drive unit
87 holding rod
91 first object
92 second object
93 third object
94 fourth object
97 readout circuit
99 signal output
101 interface
103 interface
105 arrow
A refresh rate
B image data set
C readout
D image recording time
E exposure time
F frame rate
I information
P light pulse frequency
L light pulse duration
W exposure window
Q exposure pause
S exposure
t time
R reset

The invention claimed is:

1. A camera for a recording of a representation of a virtual background that is intermittently displayed in a virtual image recording studio on an associated background display device in accordance with a light pulse frequency,
wherein the camera comprises an interface for receiving a value of the light pulse frequency of the associated background display device and a control device,
wherein the control device is configured to control the camera in accordance with a settable exposure time, and
wherein the control device is configured to determine a plurality of permitted exposure times in dependence on the received value of the light pulse frequency.

2. A camera in accordance with claim 1,
wherein the camera has an electronic rolling lens shutter or a mechanical rolling lens shutter.

3. A camera in accordance with claim 1,
wherein the camera has an image sensor comprising a plurality of light-sensitive sensor elements.

4. A camera in accordance with claim 1,
wherein the control device is configured to determine the permitted exposure times such that the permitted exposure times correspond to an integer multiple of the reciprocal of the light pulse frequency.

5. A camera in accordance with claim 1,
wherein the control device is configured to determine the plurality of permitted exposure times such that the permitted exposure times lie within a predetermined permitted range.

6. A camera in accordance with claim 1,
wherein the control device is configured to determine the permitted exposure times computationally or by looking up in a table.

7. A camera in accordance with claim 1,
wherein the camera has a display device for transmitting information to a user and is configured to display information about the determined permitted exposure times on the display device.

8. A camera in accordance with claim 7,
wherein the information represents at least one of values of the permitted exposure times or values of opening angles of a lens shutter of the camera.

9. A camera in accordance with claim 1,
wherein the control device is connected to an input device that is configured to receive, through a user input, an exposure time to be set and to transmit the latter to the control device, wherein the control device is configured to set the exposure time to be set at the camera.

10. A camera in accordance with claim 9,
wherein the control device is configured to set the exposure time to be set only when the exposure time to be set is a permitted exposure time.

11. A camera in accordance with claim 9,
wherein the control device is configured to set a permitted exposure time that is closest to the exposure time to be set when the exposure time to be set is not a permitted exposure time.

12. A camera in accordance with claim 1,
wherein the control device is configured to automatically set a permitted exposure time in dependence on the light pulse frequency.

13. A background display device for a virtual image recording studio that is configured to display, behind a real subject, a representation of a virtual background for a recording by an associated camera,
wherein the background display device has a control device that is configured to control the background display device to intermittently display the representation of the virtual background in accordance with a settable light pulse frequency,
wherein the background display device has an interface that is configured to receive a value of a set exposure time of the associated camera, and
wherein the control device is configured to set the light pulse frequency of the background display device in dependence on the received value of the set exposure time of the associated camera.

14. A background display device in accordance with claim 13,
wherein the control device is configured to set the light pulse frequency such that the light pulse frequency corresponds to an integer multiple of the reciprocal of the received value of the set exposure time.

15. A background display device for a virtual image recording studio that is configured to display, behind a real subject, a representation of a virtual background for a recording by an associated camera,
wherein the background display device has a control device that is configured to change the representation of the virtual background at settable refresh times,
wherein the background display device has an interface that is configured to receive information about exposure pauses between consecutive exposures of the associated camera, and
wherein the control device is configured to set the refresh times of the background display device in dependence on the received information about the exposure pauses of the associated camera.

16. A background display device in accordance with claim 15,
wherein the control device is configured to set the refresh times such that a respective change of the representation of the virtual background takes place during an exposure pause of the associated camera.

17. A background display device in accordance with claim 15,
wherein the received information about the exposure pauses of the associated camera represents the start, or the start and the duration, of at least one exposure pause.

18. A background display device in accordance with claim 15,
wherein the control device is connected to a memory in which at least one next representation of the virtual background is stored, wherein the control device is configured to display the stored next representation in order to change the representation of the virtual background.

19. A camera for a recording of a representation of a virtual background that is displayed in a virtual image recording studio on an associated background display device and that changes at refresh times,
wherein the camera has an interface that is configured to receive information about the refresh times of the associated background display device,
wherein the camera has a control device that is configured to control the camera in accordance with a settable exposure time, and
wherein the control device is configured to set exposure pauses of the camera in dependence on the received information about the refresh times.

20. A camera in accordance with claim 19,
wherein the control device is configured to set the exposure pauses of the camera such that during a respective change of the representation of the virtual background an exposure pause of the camera takes place.

* * * * *